(12) United States Patent
Hoshuyama

(10) Patent No.: US 8,811,627 B2
(45) Date of Patent: Aug. 19, 2014

(54) ECHO SUPPRESSING METHOD AND APPARATUS

(75) Inventor: Osamu Hoshuyama, Tokyo (JP)

(73) Assignee: NEC Corporation, Tokyo (JP)

( * ) Notice: Subject to any disclaimer, the term of this patent is extended or adjusted under 35 U.S.C. 154(b) by 1337 days.

(21) Appl. No.: 12/084,119

(22) PCT Filed: Oct. 25, 2006

(86) PCT No.: PCT/JP2006/321267
§ 371 (c)(1),
(2), (4) Date: Apr. 25, 2008

(87) PCT Pub. No.: WO2007/049643
PCT Pub. Date: May 3, 2007

(65) Prior Publication Data
US 2009/0041263 A1 Feb. 12, 2009

(30) Foreign Application Priority Data
Oct. 26, 2005 (JP) ................. 2005-311180

(51) Int. Cl.
*H04B 15/00* (2006.01)
*H04B 1/38* (2006.01)

(52) U.S. Cl.
USPC ........................ 381/94.1; 455/570

(58) Field of Classification Search
CPC ............ H04B 3/32; H04R 3/02; H04M 9/082
See application file for complete search history.

(56) References Cited

U.S. PATENT DOCUMENTS

| 5,608,793 A | 3/1997 | Uriya |
| 2004/0018860 A1 * | 1/2004 | Hoshuyama ............... 455/569.1 |
| 2006/0018860 A1 | 1/2006 | Chen et al. |
| 2006/0245583 A1 | 11/2006 | Mizushima et al. |

FOREIGN PATENT DOCUMENTS

| JP | 05-041681 | 2/1993 |
| JP | 08-009005 | 1/1996 |
| JP | 2002-009677 A | 1/2002 |
| JP | 2003-198714 A | 7/2003 |
| JP | 2004-056453 A | 2/2004 |
| JP | 2005-051744 A | 2/2005 |

OTHER PUBLICATIONS

A. Alvarez et al., "A Speech Enhancement System Based on Negative Beamforming and Spectral Subtraction," International Workshop on Acoustic Echo and Noise Control, Sep. 2001, pp. 219-222.

(Continued)

*Primary Examiner* — Hrayr A Sayadian
(74) *Attorney, Agent, or Firm* — Foley & Lardner LLP

(57) ABSTRACT

Coefficient generator generates a crosstalk coefficient that is a predetermined value and that is used to calculate the amount of crosstalk of an echo. Converter uses either the output signal of a sound pickup device or the signal obtained by subtracting the output signal of an echo canceller from the output signal of the sound pickup device as a first signal, corrects the first signal based on the crosstalk coefficient generated in coefficient generator, and produces a near-end signal obtained by removing the echo from the first signal.

7 Claims, 14 Drawing Sheets

(56) References Cited

OTHER PUBLICATIONS

E. Hansler, "The hands-free telephone problem: an annotated bibliography update," Annals of Telecommunications, vol. 49:7-8, 1994, 11 pages.

X. Lu et al., "Acoustical Echo Cancellation Over a Non-Linear Channel," International Workshop on Acoustic Echo and Noise Control, 2001, pp. 1-9.

J. Shynk, "Frequency-Domain and Multirate Adaptive Filtering," IEEE Signal Processing Magazine, Jan. 1992, pp. 14-37.

* cited by examiner

Fig.5
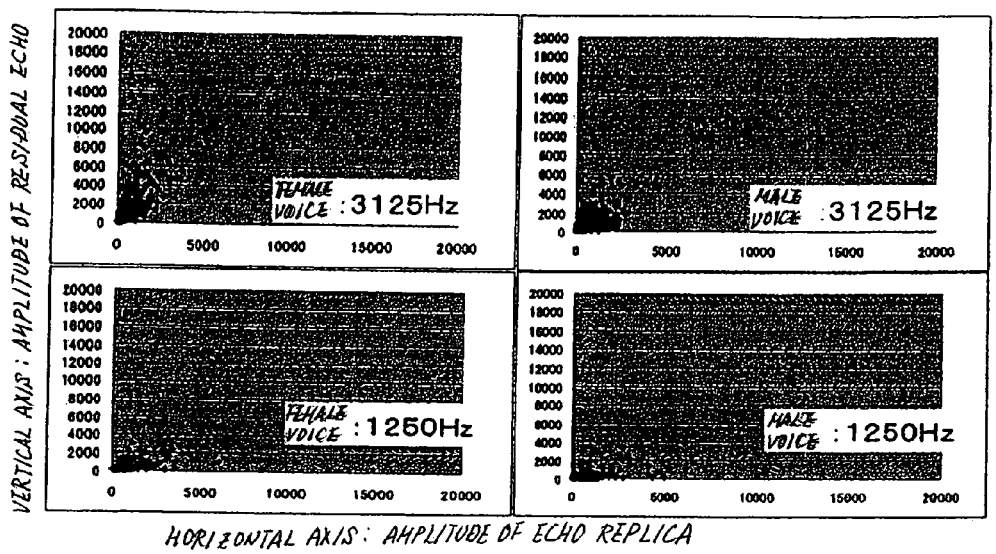
[Fig.6]
EXEMPLARY LAYOUT OF LOUDSPEAKER AND MICROPHONE
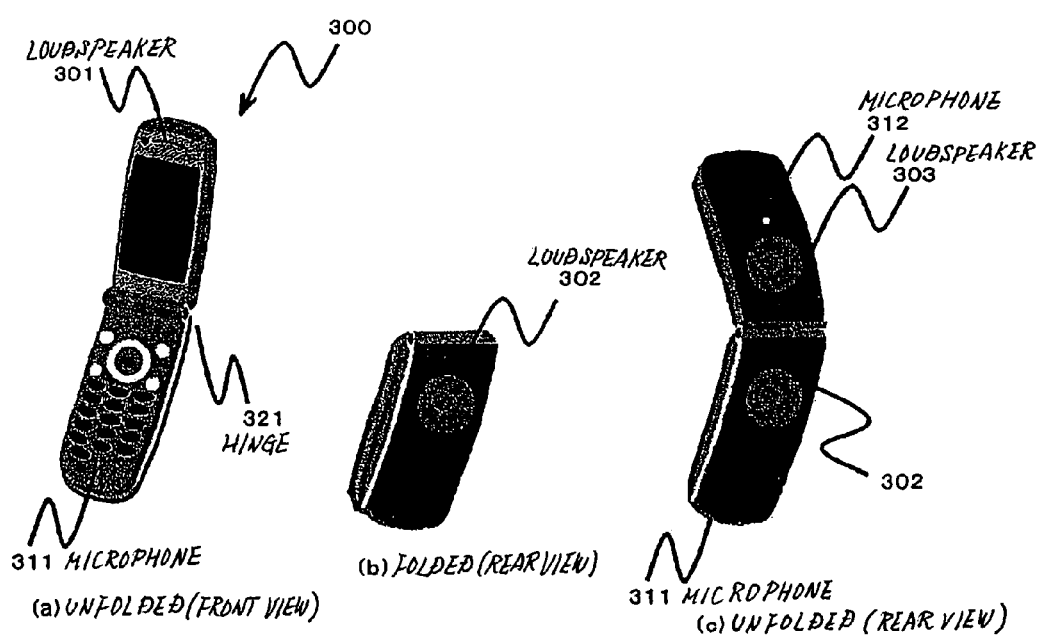

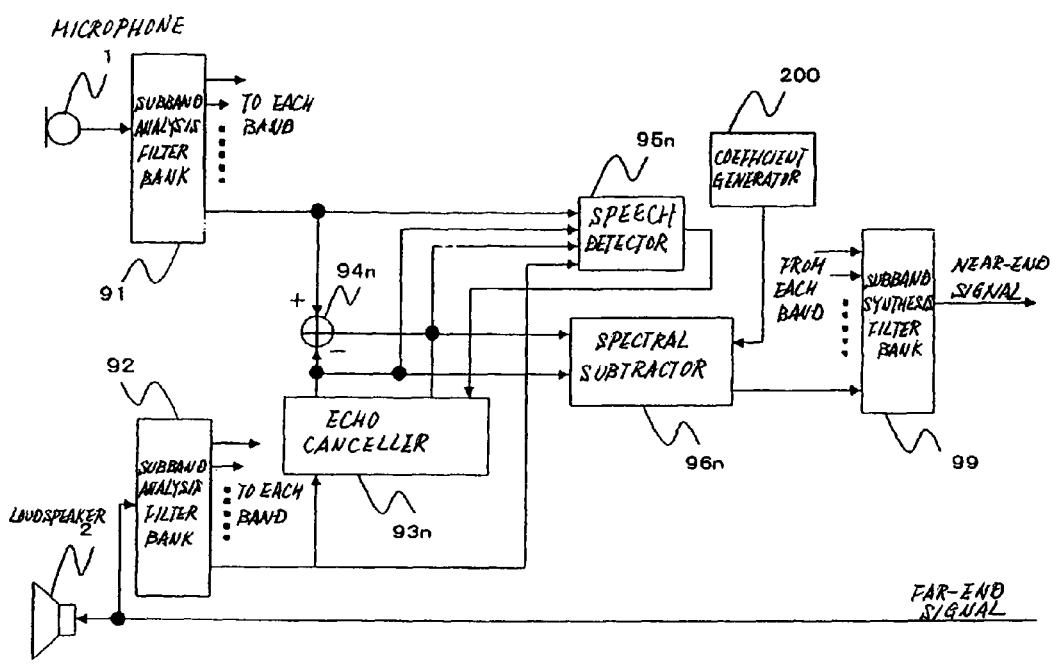
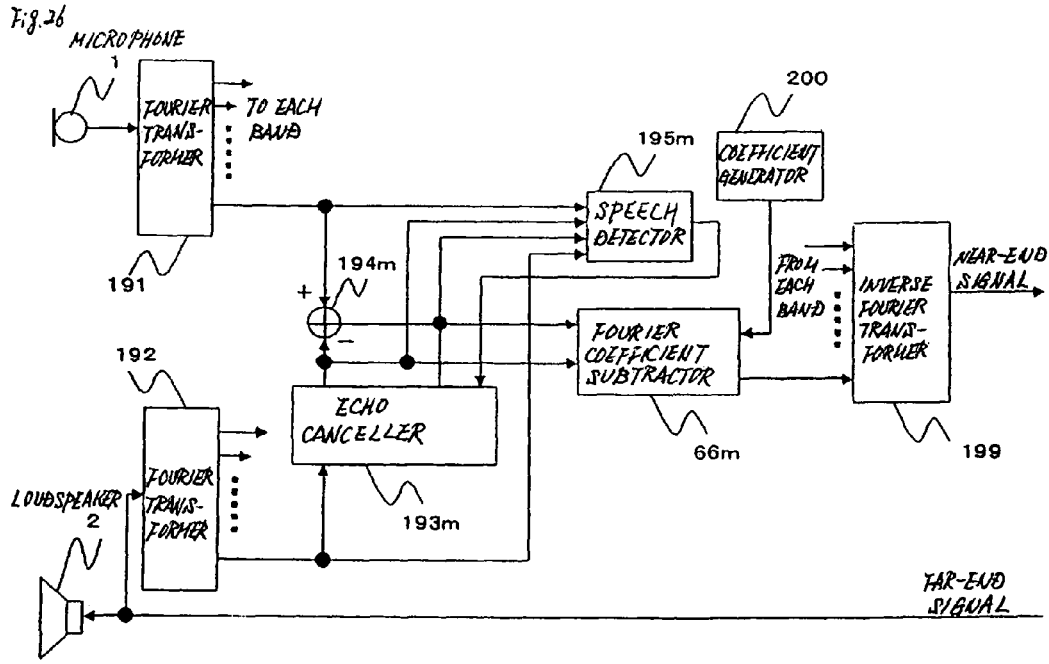

ECHO SUPPRESSING METHOD AND APPARATUS

This application is the National Phase of PCT/JP2006/321267, filed Oct. 25, 2006, which claims priority to Japanese Application No. 2005-311180, filed Oct. 26, 2005, the disclosures of which are hereby incorporated by reference in their entirety.

TECHNICAL FIELD

The present invention relates to an echo suppressing method and apparatus for suppressing an echo generated when a loudspeaker produces audio and a microphone picks up sound at the same time.

BACKGROUND ART

FIG. 1 is a block diagram showing the configuration of an echo suppressing apparatus of a first example of related art.

FIG. 1 shows an exemplary configuration of an echo suppressing apparatus for suppressing an echo generated in a hands-free phone.

In FIG. 1, an audio signal from the far-end speaker (hereinafter referred to as far-end signal) inputted to input terminal 10 is converted into far-end audio by loudspeaker 2. On the other hand, microphone 1 picks up, for example, the voice of the near-end speaker (hereinafter referred to as near-end audio) and also receives unnecessary far-end audio produced by loudspeaker 2. The sound inputted from loudspeaker 2 to microphone 1 is called an echo. The sound transfer system that handles sound-related signals, ranging from the far-end signal to the output signal of microphone 1, is called an echo path. The sound transfer system includes loudspeaker 2 and microphone 1.

Only the near-end audio is desired to be outputted as the near-end signal from output terminal 9, and the unnecessary far-end audio contained in the near-end signal is desired to be removed. In particular, when the near-end signal contains a large far-end audio signal component, delayed far-end audio is audible as an echo to the far-end speaker, so that it becomes difficult to have a conversation. To address such a problem, in a method employed in related art, a linear echo canceller is used to remove the echo from the near-end signal. A linear echo canceller is described, for example, in non-patent document 1 (Eberhard HANSLER, "The hands-free telephone problem: an annotated bibliography update," annals of telecommunications 1994, pp. 360-367).

Linear echo canceller 3 estimates the transfer function of the echo path (echo path estimation), and uses the signal inputted to loudspeaker 2 (far-end signal) to produce a simulated signal (echo replica signal) of the echo inputted to microphone 1 based on the estimated transfer function.

The echo replica signal produced in linear echo canceller 3 is inputted to subtractor 4, which subtracts the echo replica signal from the output signal of microphone 1 to extract the near-end audio signal component.

Speech detector 5 receives the output signal of microphone 1, the output signal of linear echo canceller 3, the output signal of subtractor 4, and the far-end signal, uses these signals to detect whether or not the output signal of microphone 1 contains any near-end audio, and outputs the detection result to linear echo canceller 3.

To control the operation of linear echo canceller 3, speech detector 5 outputs "zero" or a very small value as the speech detection result when speech detector 5 has detected any near-end audio in the output signal of microphone 1, while outputting a large value when speech detector 5 has detected no near-end audio.

FIG. 2 is a block diagram showing an exemplary configuration of the linear echo canceller shown in FIG. 1.

As shown in FIG. 2, linear echo canceller 3 includes adaptive filter 30, which is a linear filter, and multiplier 35. Examples of adaptive filter 30 include filters of various types, such as an FIR type, an IIR type, and a lattice type.

Adaptive filter 30 filters the far-end signal inputted to terminal 31 and outputs the processed result from terminal 32 to subtractor 4. Adaptive filter 30 uses predetermined correlation operation to update a filter coefficient in such a way that the output signal of subtractor 4 inputted to terminal 33 is minimized. To this end, adaptive filter 30 operates in such a way that the component in the output signal of subtractor 4 that correlates with the far-end signal is minimized. That is, the echo (far-end audio) will be removed from the output signal of subtractor 4.

When the output signal of microphone 1 contains near-end audio and the filter coefficient is updated in such a state, the resultant change in the filter coefficient may reduce the echo removal capability of adaptive filter 30.

Multiplier 35 is provided to control the filter coefficient update operation performed by adaptive filter 30. Multiplier 35 multiplies the output signal of subtractor 4 by the output signal of speech detector 5 and outputs the computation result to adaptive filter 30. When the output signal of microphone 1 contains near-end audio, the output signal of speech detector 5 is either "zero" or a very small value as described above, so that the filter coefficient update operation performed by adaptive filter 30 is suppressed and hence the change in the filter coefficient is small. As a result, the echo removal capability is not greatly degraded.

The echo suppressing apparatus of the first example of related art thus uses the adaptive filter to remove the echo of the far-end signal.

Next, an echo suppressing apparatus of a second example of related art will be described.

The echo suppressing apparatus of the second example of related art modifies a pseudo echo (echo replica signal), which is used to suppress an echo, according to the angle of a hinge in a folding-type mobile phone. Such a configuration is described, for example, in Japanese Patent Laid-Open No. 8-9005.

The echo suppressing apparatus of the second example of related art includes a control signal generator that detects the angle of the hinge and outputs a control signal according to the angle, and an echo controller that suppresses an echo based on the control signal.

The echo controller includes a coefficient selection circuit that holds a plurality of preset echo path tracking coefficients to produce a pseudo echo corresponding to the echo path that varies according to the angle of the hinge and that uses the control signal outputted from the control signal generator as an address signal to select an echo path tracking coefficient; an adaptive control circuit that outputs a pseudo echo modification signal to modify the pseudo echo based on the echo path tracking coefficient selected in the coefficient selection circuit; a pseudo echo generation circuit that generates the pseudo echo based on the pseudo echo modification signal; and a subtraction circuit that subtracts the produced pseudo echo from the output signal of an audio input unit (microphone).

Next, an echo suppressing apparatus of a third example of related art will be described.

The echo suppressing apparatus of the third example of related art is based on the technology described, for example, in Japanese Patent Laid-Open No. 2004-056453. The echo suppressing apparatus of the third example of related art uses either the output signal of a microphone (sound pickup device) or the signal obtained by subtracting the output signal of an echo canceller from the output signal of the sound pickup device as a first signal, and uses the output signal of the echo canceller as a second signal. Then, the echo suppressing apparatus estimates the amount of crosstalk of the second signal (far-end signal, echo) that leaks into the first signal (near-end signal), and corrects the first signal based on the estimation result.

The estimated value of the amount of echo crosstalk is the ratio of the amount according to the amplitude or power of the second signal during the period in which no near-end audio is detected to the amount according to the amplitude or power of the first signal. In the echo suppressing apparatus of the third example of related art, for each frequency component in the first and second signals, the first and second signals are used to calculate the amount of estimated echo crosstalk, and the first signal is corrected based on the estimated value that has been calculated.

The echo suppressing apparatuses of the first and second examples of related art described above can sufficiently suppress an echo when nonlinear elements, such as distortion generated in the echo path, are small. However, in an actual apparatus, a loudspeaker, for example, has a large nonlinear element. The transfer function of an echo path containing distortion is nonlinear, so that linear echo canceller 3 cannot simulate an accurate transfer function of the echo path. In particular, when a small-sized loudspeaker used in a mobile phone or the like produces sound at high-volume levels, a large amount of distortion contained in the sound limits the suppression of the echo to approximately 20 dB. In this case, the echo is transmitted as the near-end signal and is audible to the far-end speaker, so that it becomes difficult to have a conversation.

In contrast, in the third example of related art, an echo is sufficiently suppressed even when the echo path generates a large amount of distortion. The echo suppressing apparatus of the third example of related art, however, requires a large amount of computation because of a complicated process for estimating the amount of echo crosstalk. In particular, it requires a large amount of division operation. Further, since the echo suppressing apparatus of the third example of related art uses the speech detection result indicative of whether or not the output signal of the microphone contains near-end audio, a wrong speech detection result increases the error in the amount of estimated echo crosstalk, so that the corrected first signal, which is corrected based on the estimation result, will be degraded. That is, the echo will not be sufficiently suppressed, or the near-end audio will contain a large amount of distortion. In particular, when the echo suppressing apparatus is used in an environment in which near-end audio along with high-level noise (near-end noise) is inputted, the error in the speech detection result likely increases, so that the echo will not be sufficiently suppressed, or the near-end audio will contain a large amount of distortion.

DISCLOSURE OF THE INVENTION

Accordingly, an object of the present invention is to provide an echo suppressing method and apparatus that can easily and sufficiently suppress an echo even when the distortion resulting from the echo path is large.

Another object of the present invention is to provide an echo suppressing method and apparatus that can suppress an echo without being affected by near-end noise.

To achieve the above objectives, in the present invention, either the output signal of a sound pickup device or the signal obtained by subtracting the output signal of an echo canceller from the output signal of the sound pickup device is used as a first signal, and the output signal of the echo canceller is used as a second signal. Then, a crosstalk coefficient, which is a predetermined value and which is used to calculate the amount of crosstalk of the second signal that leaks into the first signal, is used to correct the first signal.

When the echo canceller is a linear echo canceller, harmonic wave components contained in the far-end signal almost directly appear in the output of the echo canceller. Even when the echo canceller is a nonlinear echo canceller, the output of the echo canceller contains quite a few harmonic wave components contained in the far-end signal.

On the other hand, the output signal of the sound pickup device (microphone) contains harmonic wave components generated by an echo of the far-end signal due to the acoustic coupling between the sound pickup device and a loudspeaker as well as acoustic distortion. The proportion of the harmonic wave components, that is, the value indicative of the amount of echo crosstalk, falls within a fixed range in limited applications, such as a voice call.

The echo can therefore be removed from the first signal by setting the crosstalk coefficient, which is used to calculate the amount of echo crosstalk, to a constant, using the crosstalk coefficient and the second signal to estimate the amount of echo contained in the first signal, and subtracting the estimated value from the first signal. Alternatively, the echo can be removed by using the crosstalk coefficient, the first signal, and the second signal to estimate the proportion of the near-end signal contained in the first signal, and multiplying the first signal by the estimated proportion.

In the present invention, the crosstalk coefficient is a constant. Therefore, even when the near-end signal contains high-level noise, an echo having a large amount of distortion resulting from the echo path can sufficiently be suppressed. Further, unlike estimation of the amount of echo crosstalk shown in the third example of related art, no complicated computation is required, so that the amount of computation can be reduced. Therefore, the echo can be easily suppressed without being affected by the near-end noise.

BRIEF DESCRIPTION OF THE DRAWINGS

FIG. 5 shows graphs illustrating the results of experiments carried out to investigate the correlation between the echo replica signal spectrum and the residual echo spectrum.

FIG. 6 is a diagrammatic view showing an exemplary configuration of a mobile phone including a plurality of loudspeakers and microphones.

FIG. 25 is a block diagram showing the configuration of a sixth exemplary embodiment of the echo suppressing apparatus according to the present invention.

FIG. 26 is a block diagram showing the configuration of a seventh exemplary embodiment of the echo suppressing apparatus according to the present invention.

BEST MODE FOR CARRYING OUT THE INVENTION

The present invention will be described below with reference to the drawings.

Figure 3:
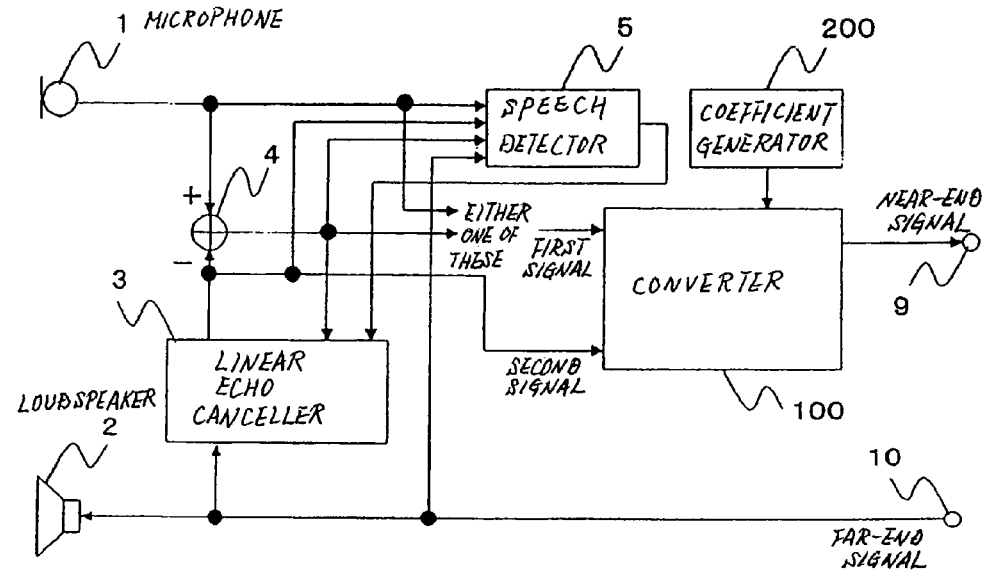
FIG. 3 is a block diagram showing an exemplary configuration of the echo suppressing apparatus according to the present invention.

FIG. 3 is a block diagram showing an exemplary configuration of the echo suppressing apparatus according to the present invention.

As shown in FIG. 3, the echo suppressing apparatus of the present invention is the echo suppressing apparatus of the first example of related art shown in FIG. 1 combined with coefficient generator 200 that generates a coefficient (hereinafter referred to as crosstalk coefficient) used to calculate the amount of crosstalk of a far-end signal (echo) that leaks into a near-end signal, the crosstalk occurring due to the acoustic coupling between microphone 1 and loudspeaker 2, and combined with converter 100 that uses either the output signal of microphone 1 or the output signal of subtractor 4 as a first signal and the output signal of linear echo canceller 3 as a second signal, corrects the first signal based on the crosstalk coefficient generated by coefficient generator 200 and the second signal, and outputs the near-end signal obtained by removing the echo from the first signal. The far-end signal inputted to loudspeaker 2 is inputted from terminal 10, and the near-end signal is outputted from terminal 9.

Linear echo canceller 3 may be a nonlinear echo canceller.

The first and second signals are divided into signals in predetermined frequency ranges, and coefficient generator 200 generates crosstalk coefficients corresponding to the respective frequency ranges. Then, for each of the frequency ranges, converter 100 uses the corresponding crosstalk coefficient to correct the first signal. Further, coefficient generator 200 preferably switches among the crosstalk coefficients according to predetermined use conditions.

Figure 4:
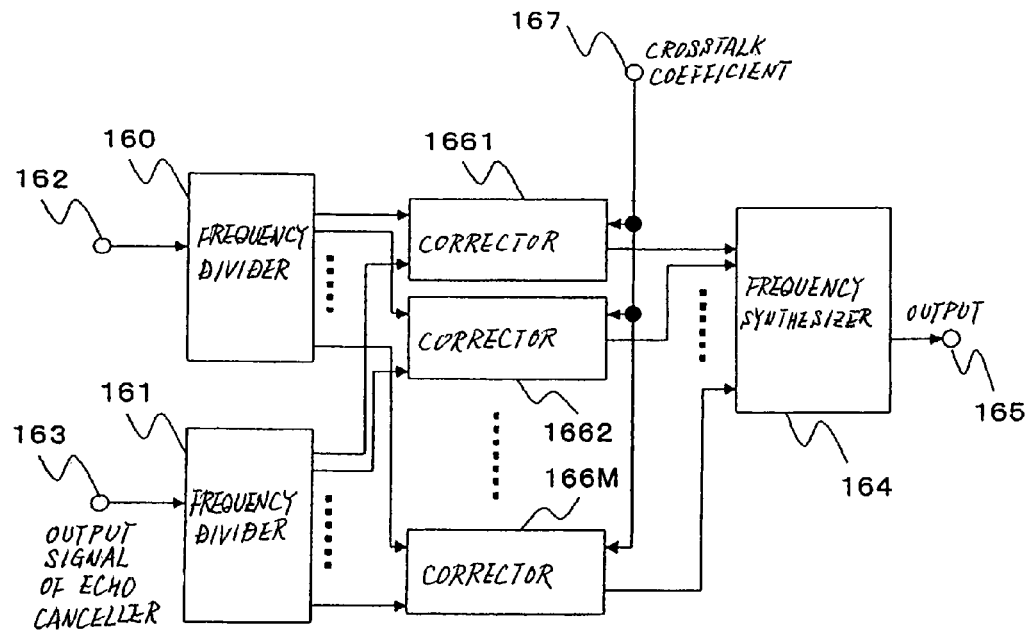
FIG. 4 is a block diagram showing an exemplary configuration of the converter shown in FIG. 3.

FIG. 4 is a block diagram showing an exemplary configuration of the converter shown in FIG. 3.

As shown in FIG. 4, converter 100 includes frequency dividers 160 and 161, M correctors 166$m$ (m=1 to M), and frequency synthesizer 164.

Frequency divider 160 divides the first signal inputted through terminal 162 into M signals for respective predetermined frequency ranges and outputs them to correctors 166$m$ corresponding to the respective frequency ranges. Frequency divider 161 divides the second signal inputted through terminal 163 into M signals for respective predetermined frequency ranges and outputs them to correctors 166$m$ corresponding to the respective frequency ranges. Corrector 166$m$ uses the crosstalk coefficient generated by coefficient generator 200 and inputted through terminal 167 and the second signal to correct the first signal, and outputs the corrected signal to frequency synthesizer 164. The output signals of the correctors 166$m$ undergo frequency synthesis in frequency synthesizer 164, and the synthesized signal is outputted from terminal 165.

Corrector 166$m$ uses the crosstalk coefficient and the second signal to estimate the magnitude of the echo contained in the first signal and subtracts the estimated magnitude of the echo from the first signal to correct the first signal. Alternatively, corrector 166$m$ may estimate the proportion of the near-end signal contained in the first signal based on the crosstalk coefficient, the first signal, and the second signal and multiply the first signal by the estimated proportion of the near-end signal to correct the first signal.

Frequency dividers 160 and 161 use an arbitrary linear transformation, such as Fourier transformation, cosine transformation, a subband analysis filter bank, to carry out frequency division. Frequency synthesizer 164 uses inverse Fourier transformation, inverse cosine transformation, and a subband synthesis filter bank corresponding to the linear transformation used in frequency dividers 160 and 161 to carry out frequency synthesis.

The echo suppressing apparatus of the present invention differs from the third example of related art, which uses the first and second signals to calculate the amount of echo crosstalk as appropriate, in that the crosstalk coefficient is a constant. In the third example of related art, a constant crosstalk coefficient is believed to be inappropriate because the amount of echo crosstalk depends on the frequency spectral distribution of the far-end signal. However, the present inventor has experimentally confirmed that the degree of difference in frequency spectral distribution between female and male voices allows use of a constant as the crosstalk coefficient and sufficient suppression of an echo as long as voice conversation is intended. This conclusion is described below in detail.

FIG. 5 shows graphs illustrating the results of experiments carried out to investigate the correlation between the echo replica signal spectrum and the residual echo spectrum. The horizontal axis of each of the graphs shown in FIG. 5 represents the amplitude of the echo replica signal (the output amplitude of linear echo canceller 3), and the vertical axis represents the amplitude of the residual echo (the echo component contained in the first signal).

The slope of the correlation (the amplitude of the residual echo/the amplitude of the echo replica) represents the magnitude of the distortion of the echo. The steeper the slope, the larger the distortion. That is, the slope of the correlation corresponds to the crosstalk coefficient.

FIG. 5 shows that the slope of the correlation, even when derived from the same female voice, changes with frequency. The same argument applies to male voice. For the same frequency, however, the slope of the correlation for female voice is substantially the same as the slope of the correlation for male voice. Although not shown in FIG. 5, when the far-end signal is a sound, such as music, which is significantly different from human voice in terms of the spectral distribution, the slope of the correlation is completely different from that of human voice even at the same frequencies as those shown in the graphs in FIG. 5 (1250 Hz and 3125 Hz). The reason for this is that music or the like, which contains lower frequency components, contains much more frequency components that generates harmonic waves responsible for the residual echo than human voice does.

As described above, it has been confirmed that the slope of the correlation between the echo replica signal and the residual echo thus depends on the frequency spectral distribution of the far-end signal, but the degree of difference in frequency spectral distribution between female and male voices does not greatly change the slope of the correlation for each frequency, but the slopes of the correlation for female and male voices are similar to each other. This result proves that the same crosstalk coefficient may be used as long as voice conversation is intended.

However, as shown in FIG. 5, the slope of the correlation between the echo replica signal and the residual echo changes with frequency. The echo can therefore sufficiently be suppressed by generating different crosstalk coefficients for the frequency ranges of the first signal in coefficient generator 200 and by using a crosstalk coefficient according to each of the frequency ranges to correct the first signal in converter 100.

Distorted echo sound, which is believed not to be sufficiently suppressed by linear echo canceller 3, is broadly classified into distorted sound produced in loudspeaker 2 itself and distorted sound produced, when the housing in which microphone 1 and loudspeaker 2 are disposed, vibrates. Further, these distorted sounds change according to use conditions of the apparatus to which echo suppression is applied. Therefore, coefficient generator 200 desirably switches among the crosstalk coefficients according to use conditions of the apparatus to which echo suppression is applied and outputs the selected crosstalk coefficient.

A description will be made below with reference to the case where the crosstalk coefficient is switched according to the use conditions of a mobile phone by way of example.

The distorted sound produced in loudspeaker 2 itself results from nonlinear loudspeaker characteristics. Therefore, in a mobile phone in which a plurality of loudspeakers 301 to 303 having characteristics that are different from one another are switched as appropriate as shown in FIG. 6, distorted echo sound depends on which loudspeaker is used. In such a use condition, the loudspeaker being used may be detected, and the crosstalk coefficient may be switched according to the detected loudspeaker.

In a mobile phone equipped with only one loudspeaker 2 as well, the magnitude of distorted sound that reaches microphone 1 from loudspeaker 2 changes when the positional relationship between loudspeaker 2 and microphone 1 changes, so that the distortion of the echo also changes. In such a use condition, the position of loudspeaker 2 relative to microphone 1 may be detected, and the crosstalk coefficient may be switched according to the detected relative position. For example, in folding-type mobile phone 300 shown in FIG. 6, since the angle of hinge 321 determines the positional relationship between loudspeaker 2 and microphone 1, the angle of hinge 321 may be detected and the crosstalk coefficient may be switched according to the angle.

In folding-type mobile phone 300 shown in FIG. 6, when a plurality of microphones 311 and 312 are switched and used as appropriate, the positional relationship relative to loudspeaker 2 changes depending on which microphone is used. In such a use condition, the microphone being used may be detected, and the crosstalk coefficient may be switched to a predetermined one according to the position of the detected microphone.

On the other hand, the distorted sound resulting from the vibration of the housing is primarily produced at the joint that connects the parts. For example, when the sound outputted from loudspeaker 2 causes the housing to vibrate and distorted sound is produced from a joint that connects parts, the distorted sound is inputted to microphone 1 as the distortion of the echo. Therefore, when the sound level of loudspeaker 2 changes, the acoustic energy transmitted from loudspeaker 2 to the housing changes, and the distorted sound produced at the joint that connects the parts also changes. In such a use condition, the sound level that loudspeaker 2 has been set to produce may be detected, and the crosstalk coefficient may be switched according to the sound level that has been set.

In folding-type mobile phone 300 shown in FIG. 6, the amount of housing vibration varies depending on whether or not the mobile phone is completely folded, and the distorted sound produced at the joint that connects the parts also varies. In such a use condition, detection may be performed to determine whether or not mobile phone 300 is completely folded, and the crosstalk coefficient may be switched according to the detection result.

In folding-type mobile phone 300 shown in FIG. 6, the position of the loudspeaker changes with the folding angle, so that the acoustic energy, even when measured at the same location in the housing, that is transmitted from loudspeaker 2 changes with the angle of hinge 321, and hence the distorted sound produced at the joint that connects the parts changes. In such a use condition as well, the angle of hinge 321 may be detected, and the crosstalk coefficient may be switched according to the angle.

In a sliding-type mobile phone, detection may be performed to determine whether or not the sliding operation has occurred or to determine the amount of sliding, and the crosstalk coefficient may be switched according to the detection result. In a mobile phone including both the sliding and folding mechanisms, detection may be performed to determine the angle of the hinge, whether or not the mobile phone is folded, whether or not the sliding operation has occurred, or the amount of sliding, and the crosstalk coefficient may be switched according to the detection result. In a mobile phone that is not of the sliding-type or folding-type, detection may be performed to determine the factors that change the acoustic energy that is transmitted to the joint that connects the parts in the housing or to determine the factors that influence the change in echo sound level, and the crosstalk coefficient may be switched according to the detection result.

Figure 7:
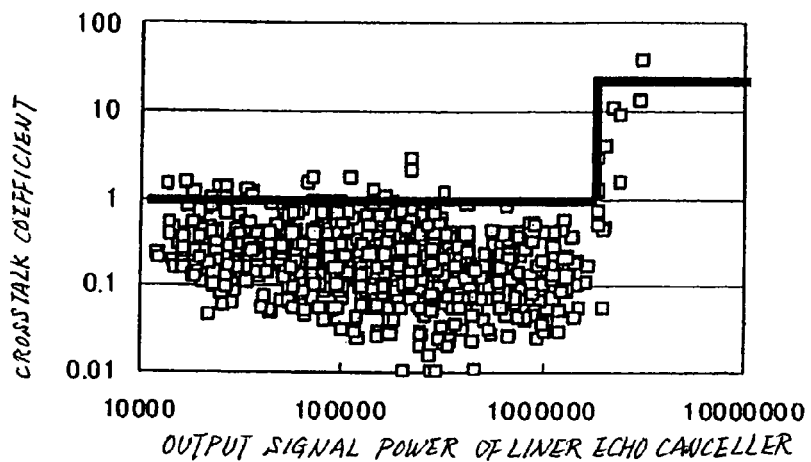
FIG. 7 shows a graph illustrating the relationship between the crosstalk coefficient that can sufficiently suppress an echo and the power of the output signal of the linear echo canceller.

Further, the present inventor has experimentally confirmed that any increase in power or amplitude of the signal outputted from linear echo canceller 3 will change the nonlinearity of the echo path. That is, when a distorted echo is produced under the condition in which the output signal of microphone 1 contains no near-end signal, an investigation is carried out to determine the relationship between the crosstalk coefficient that can sufficiently suppress the echo and the power of the output signal of linear echo canceller 3, and the result shown in FIG. 7 has been provided. FIG. 7 shows the relationship between the output signal of linear echo canceller 3 in a frequency band centered around 1875 Hz and the corresponding crosstalk coefficient. The horizontal axis of the graph shown in FIG. 7 represents the power of the output signal of linear echo canceller 3, and the vertical axis represents the crosstalk coefficient that can sufficiently suppress the echo.

As seen from the distribution of the plotted points shown in FIG. 7, the crosstalk coefficient that can sufficiently suppress the echo abruptly changes when the power of the output signal of linear echo canceller 3 reaches 2000000. The reason for this is believed to be an abrupt increase in distortion of the echo resulting from the nonlinear loudspeaker characteristics because, when the power of signal that is outputted from linear echo canceller 3 is large, this means that the power of the signal inputted to linear echo canceller 3, that is, the far-end signal inputted to loudspeaker 2, is also large.

Therefore, in the echo suppressing apparatus of the present invention, the power or amplitude of the signal outputted from linear echo canceller 3 is detected as the use condition, and the crosstalk coefficient is switched according to the detected value. In this method, the power or amplitude of the output signal of linear echo canceller 3 can be replaced with the power or amplitude of the far-end signal, or with the power or amplitude of a specific frequency component contained in the far-end signal.

The method for switching among crosstalk coefficients based on the output signal of linear echo canceller 3 is similar to a method for switching among crosstalk coefficients based on the sound level that loudspeaker 2 has been set to produce. In the latter method, however, a crosstalk coefficient according to the sound level setting is selected even when there is no far-end signal and hence no echo suppression is required. On the other hand, the former method is superior to the latter in that such a wrong crosstalk coefficient will not be selected.

In the method for switching among crosstalk coefficients described above, it is not necessary to detect all the use conditions described above to switch among crosstalk coefficients, but one or more of the use conditions may be detected to switch among crosstalk coefficients.

For example, in the situation where a mobile phone that is equipped with a plurality of cameras is used to make a call while both parties exchange their videos (a so-called TV phone), and where microphones and loudspeakers are automatically switched according to the camera being used in the mobile phone, direct detection of the microphone or loudspeaker being used may be replaced with detection of the microphone or loudspeaker being used based on image information captured by the camera.

Upon the determination of a use condition that is to be used in switching among crosstalk coefficients, an optimum crosstalk coefficient corresponding to that use condition is determined in an experiment or in a computer simulation, and the crosstalk coefficient along with the corresponding use condition is saved in coefficient generator 200.

The use conditions that can be detected by a sensor or the like that is provided external to the echo suppressing apparatus, such as the angle of the hinge, the sound level that the loudspeaker has been set to produce, and the loudspeaker being used, may be detected and the detection results may be inputted to coefficient generator 200. Other use conditions, such as the power or amplitude of the far-end signal, the power or amplitude of the output signal of linear echo canceller 3, and the power or amplitude of a specific frequency component contained in the far-end signal, may be detected in the echo suppressing apparatus, and the detection results may be inputted to coefficient generator 200.

According to the echo suppressing apparatus of the present invention, an echo produced in association with the echo path can be sufficiently suppressed by setting a constant crosstalk coefficient even in an environment in which high-level noise is inputted as the near-end audio because the constant crosstalk coefficient is not affected by noise. Further, since no complicated computation, such as estimation of the amount of echo crosstalk shown in the third example of related art, is required, the amount of computation can be reduced. Therefore, the echo can easily be suppressed without being affected by near-end noise.

In particular, an echo produced in association with distorted sound can also be suppressed in a satisfactory manner by selecting an optimum crosstalk coefficient according to the use conditions.

Exemplary embodiments of the echo suppressing apparatus according to the present invention will now be described with reference to the corresponding Figs.

FIRST EXEMPLARY EMBODIMENT

Figure 8:
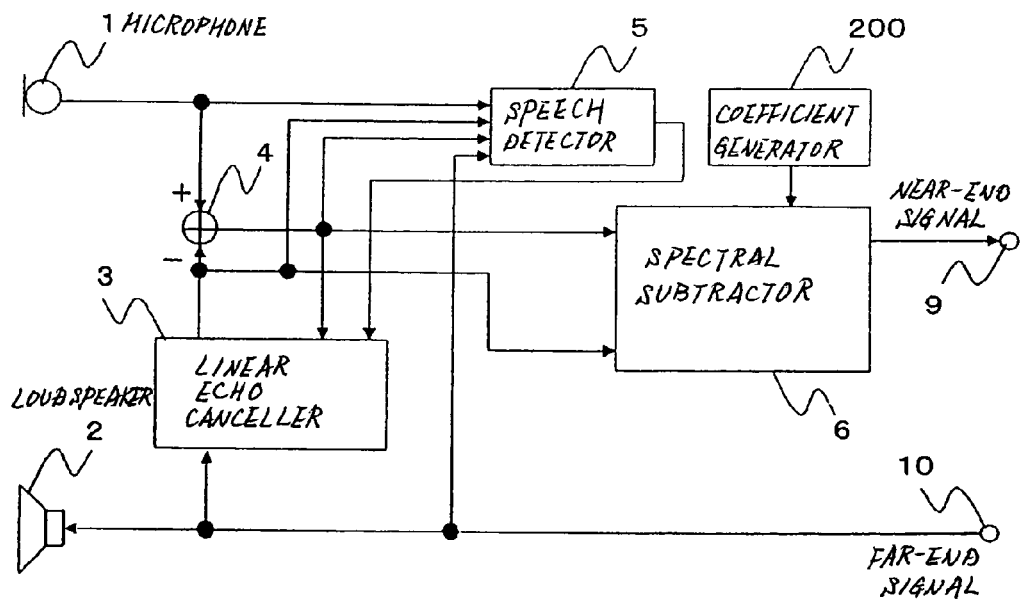
FIG. 8 is a block diagram showing the configuration of a first exemplary embodiment of the echo suppressing apparatus according to the present invention.

FIG. 8 is a block diagram showing the configuration of a first exemplary embodiment of the echo suppressing apparatus according to the present invention.

In the echo suppressing apparatus of the first exemplary embodiment, spectral subtractor 6 is used as converter 100 shown in FIG. 3.

Coefficient generator 200 in the first exemplary embodiment generates a crosstalk coefficient indicative of the amount of echo crosstalk that is occurring due to acoustic coupling between microphone 1 and loudspeaker 2 as described above.

Spectral subtractor 6 receives the output signal of subtractor 4, the output signal of linear echo canceller 3, the crosstalk coefficient generated in coefficient generator 200, and the speech detection result from speech detector 5.

Spectral subtractor 6 divides the output signal of subtractor 4 and the output signal of linear echo canceller 3 into signals in respective predetermined frequency ranges, and removes echoes from the signal components in the divided frequency ranges.

<Coefficient Generator 200>

Figure 9:
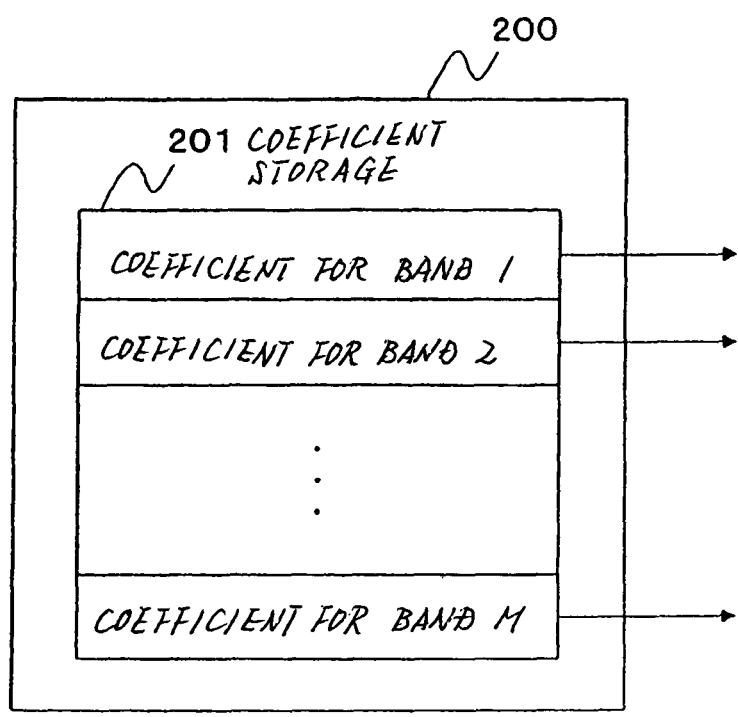
FIG. 9 is a block diagram showing an exemplary configuration of the coefficient generator shown in FIG. 8.

FIG. 9 is a block diagram showing an exemplary configuration of the coefficient generator shown in FIG. 8.

Coefficient generator 200 shown in FIG. 9 includes coefficient storage 201 that holds crosstalk coefficients appropriate for frequency ranges, band 1 to band M.

Coefficient generator 200 reads the crosstalk coefficient for each of the frequency ranges (bands) stored in coefficient storage 201 and outputs it to spectral subtractor 6. Such crosstalk coefficients correspond to, for example, the slope of correlation at the frequency of 1250 Hz and the slope of correlation at the frequency of 3125 Hz shown in FIG. 5.

Figure 10:
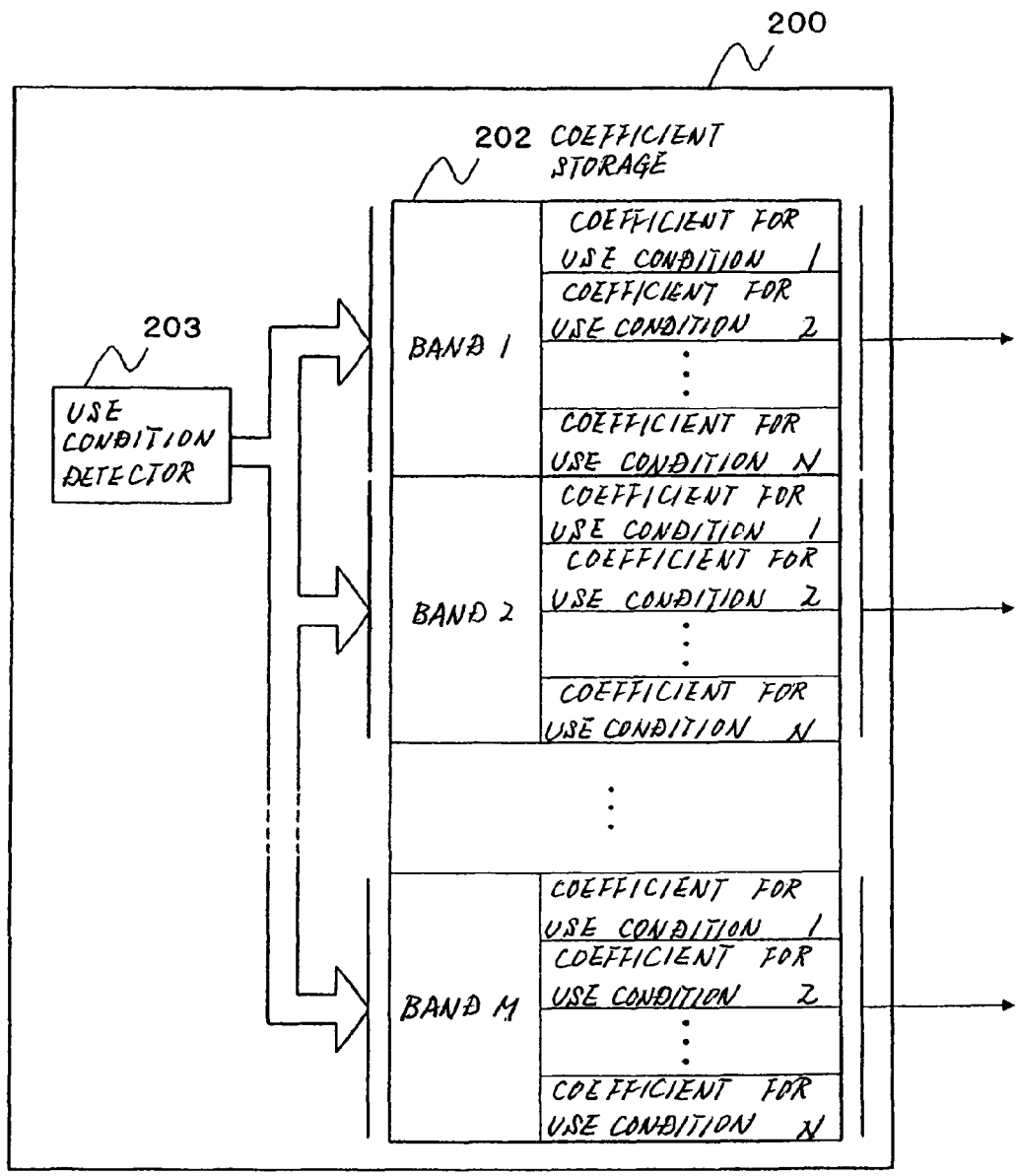
FIG. 10 is a block diagram showing another exemplary configuration of the coefficient generator shown in FIG. 8.

FIG. 10 is a block diagram showing another exemplary configuration of the coefficient generator shown in FIG. 8.

Coefficient generator 200 shown in FIG. 10 includes coefficient storage 202 that holds a group of crosstalk coefficients appropriate for the frequency ranges, band 1 to band M, and use condition detector 203 that detects various use conditions of a system including the echo suppressing apparatus of the present invention.

Coefficient generator 200 shown in FIG. 10 reads a crosstalk coefficient from the group of crosstalk coefficients corresponding to each of the frequency ranges, the crosstalk coefficient to be read corresponding to the use condition that is detected in use condition detector 203, and outputs the crosstalk coefficient that has been read to spectral subtractor 6.

In the configuration shown in FIG. 10, the group of crosstalk coefficients corresponding to each of the frequency ranges include the crosstalk coefficient for use condition 1, the crosstalk coefficient for use condition 2, . . . , the crosstalk coefficient for use condition N, where N is an arbitrary value being at least two.

As an example of a use condition, to detect the sound level that loudspeaker 2 has been set to produce, use condition detector 203 includes a sensor that detects the sound level that loudspeaker 2 has been set to produce and a discriminator that compares the detected sound level that has been set with a predetermined threshold value and converts the comparison result into a digital value representing at least two values.

As another example of a use condition, the angle of the hinge in a folding-type mobile phone is detected. In this case, use condition detector 203 includes a sensor (not shown) that detects the angle of the hinge and a discriminator (not shown) that compares the detected angle with a predetermined threshold value and converts the comparison result into a digital value representing at least two values.

As another example of the use condition, to detect the loudspeaker being used in a mobile phone equipped with a plurality of loudspeakers, use condition detector 203 includes a judgment unit (not shown) that judges which loudspeaker is being used and outputs the judgment result using a digital value that represents at least two values.

As another example of the use condition, to detect the microphone being used in a mobile phone equipped with a plurality of microphones, use condition detector 203 includes a judgment unit (not shown) that judges which microphone is being used and outputs the judgment result using a digital value that represents at least two values.

As another example of the use condition, to detect the power or amplitude of the output signal of linear echo canceller 3, use condition detector 203 includes a detector (not shown) that detects the power or amplitude of the output signal of linear echo canceller 3 and a discriminator (not shown) that compares the detected power or amplitude with a threshold value and converts the comparison result into a digital value representing at least two values. For example, when a system including the echo suppressing apparatus of the present invention is characterized as in the graph in FIG. 5, the necessary crosstalk coefficient abruptly changes from 1 to 20 when the output power of linear echo canceller 3 reaches 2000000. Therefore, the threshold value may be set to 2000000, and "0" may be outputted when the output power is smaller than or equal to 2000000, whereas "1" may be outputted when the output power is greater than 2000000.

In addition to the above use conditions, any use condition can be used as long as it affects the amount of echo crosstalk. It is also possible to use a combination of a plurality of use conditions.

Coefficient storage 202 selects one crosstalk coefficient corresponding to the output signal of use condition detector 203 from a plurality of crosstalk coefficients preregistered in correspondence to the frequency ranges, and outputs the selected crosstalk coefficient to spectral subtractor 6.

For example, when the power characteristics of the output signal of linear echo canceller 3 is used as the use condition, two crosstalk coefficients "1" and "20" indicated by the solid line in FIG. 7 are used. These two crosstalk coefficients correspond to the frequency range centered around 1875 Hz. The crosstalk coefficient "1" is outputted when use condition detector 203 outputs "0", whereas the crosstalk coefficient "20" is outputted when use condition detector 203 outputs "1".

<Spectral Subtractor 6>

Figure 11:
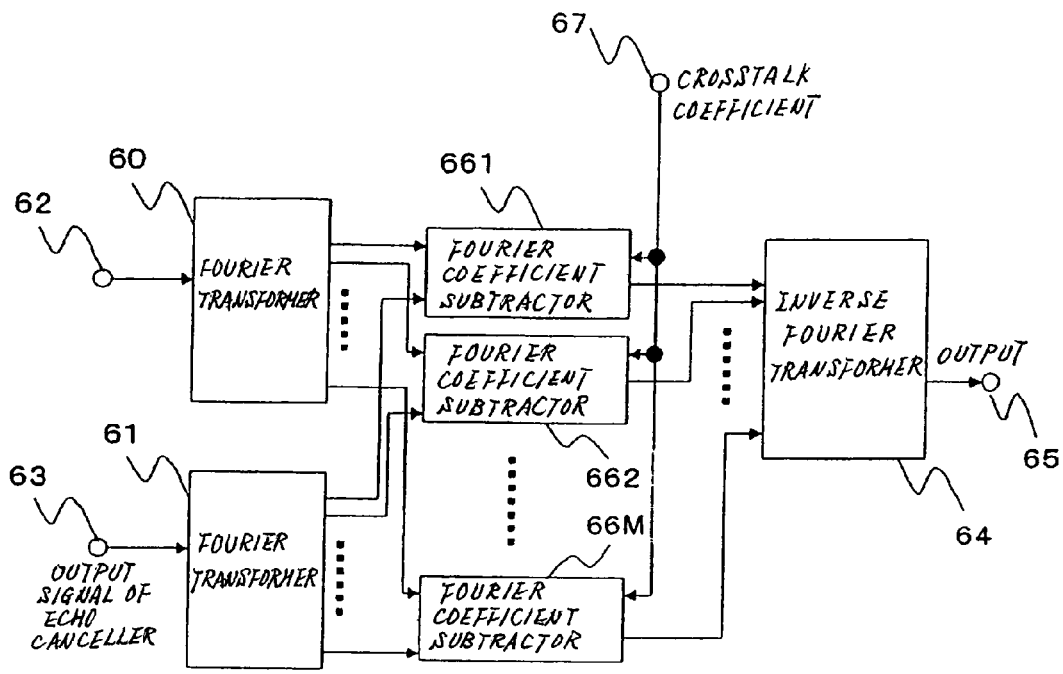
FIG. 11 is a block diagram showing an exemplary configuration of the spectral subtractor shown in FIG. 8.

FIG. 11 is a block diagram showing an exemplary configuration of the spectral subtractor shown in FIG. 8.

As shown in FIG. 11, spectral subtractor 6 includes Fourier transformers 60 and 61, Fourier coefficient subtractors $66m$ (m=1 to M), and inverse Fourier transformer 64.

Fourier transformer 60 carries out M-point Fourier transformation on the output signal of subtractor 4 and outputs the processed results (amplitude and phase) as first Fourier coefficients to Fourier coefficient subtractors $66m$ (m=1 to M) corresponding to the respective frequency ranges.

Fourier transformer 61 carries out M-point Fourier transformation on the echo replica signal outputted from linear echo canceller 3 and outputs the processed results (amplitude and phase) as second Fourier coefficients to Fourier coefficient subtractors $66m$ corresponding to the respective frequency ranges.

Each of Fourier coefficient subtractors $66m$ receives the first Fourier coefficient outputted from Fourier transformer 60, the second Fourier coefficient outputted from Fourier transformer 61, and the crosstalk coefficient outputted from coefficient generator 200 shown in FIG. 8, carries out a subtraction operation using the amplitude components of the received coefficients to calculate Fourier coefficients, and outputs the calculation results (amplitude and phase) to inverse Fourier transformer 64.

Inverse Fourier transformer 64 carries out inverse Fourier transformation on the group of Fourier coefficients outputted from Fourier coefficient subtractors 661 to 66M, and outputs the real part of the processed result.

Fourier coefficient subtractors $66m$ (m=1 to M) shown in FIG. 11 will be described with reference to FIG. 12.

Figure 12:
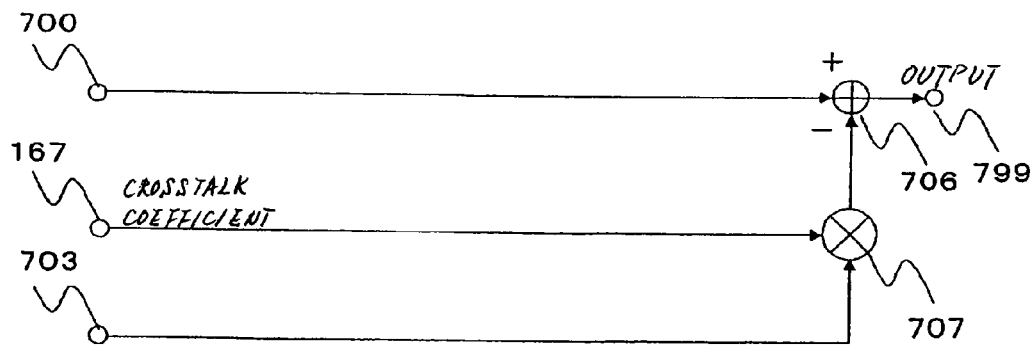
FIG. 12 is a block diagram showing a first exemplary configuration of the Fourier coefficient subtractor shown in FIG. 11.

FIG. 12 is a block diagram showing a first exemplary configuration of one of the Fourier coefficient subtractors shown in FIG. 11.

The first Fourier coefficient for each of the frequency ranges outputted from Fourier transformer 60 shown in FIG. 11 is supplied to subtractor 706 through terminal 700.

The second Fourier coefficient outputted from Fourier transformer 61 shown in FIG. 11 is supplied to multiplier 707 through terminal 703. The crosstalk coefficient generated in coefficient generator 20 is supplied to multiplier 707 through terminal 167.

Multiplier 707 multiplies the crosstalk coefficient by the second Fourier coefficient and outputs the multiplication result to subtractor 706. Subtractor 706 subtracts the output value of multiplier 707 from the first Fourier coefficient and outputs the computation result. The computation result of subtractor 706 is outputted to inverse Fourier transformer 64 shown in FIG. 11.

By multiplying the crosstalk coefficient by the second Fourier coefficient calculated from the output signal of linear echo canceller 3, multiplier 707 provides an estimated value of the Fourier coefficient obtained from the echo remaining in the first Fourier coefficient. By using subtractor 706 to subtract the estimated value of the Fourier coefficient obtained from the echo from the first Fourier coefficient, an estimated value of the Fourier coefficient for the near-end signal having a suppressed echo component is provided.

Inverse Fourier transformer 64 shown in FIG. 11 synthesizes the estimated values for the respective frequency ranges and outputs the synthesized value as the near-end signal. As a result, the synthesized near-end signal becomes a signal having a suppressed echo.

The operation of Fourier coefficient subtractor 66*m* described above will be described with reference to equations.

Let S be the Fourier coefficient for the near-end signal, A be the near-end audio component contained in the near-end signal, E be the echo component, and N be the noise component. These parameters satisfy the following relationship:

$$S = A + E + N \quad (1)$$

Let R be the Fourier coefficient for the echo replica signal, and P1 be the crosstalk coefficient. P1 is an approximate value of the portion of the far-end signal R that leaks into the near-end signal as an echo, and corresponds to the gain of the echo in the echo path. In the echo suppressing apparatus of the third example of related art, P1 is expressed by the following equation:

$$P1 = Av[S/R] = Av[(E+N)/R] \quad (2)$$

where Av[•] represents a smoothing process.

Therefore, multiplying crosstalk coefficient P1 by Fourier coefficient R for the echo replica signal provides value P2 (corresponding to the output signal of multiplier 707), which is an estimated value of the echo component.

$$\begin{aligned} P2 &= P1 \times R \\ &= Ex[E] \end{aligned} \quad (3)$$

where Ex[•] represents an estimated value.

Subtracting P2 from S provides value P3 (corresponding to the output signal of subtractor 706: near-end signal).

$$\begin{aligned} P3 &= S - P2 \\ &= S - P1 \times R \\ &= A + E + N - Ex[E] \\ &= Ex[A + N] \end{aligned} \quad (4)$$

That is, the output of subtractor 706 is an estimated value of the sum of Fourier coefficient component A and noise component N for the near-end audio from which echo component E is removed.

A description will be made of how the echo suppressing apparatus of the first exemplary embodiment shown in FIG. 8 operates when distortion is generated in the loudspeaker or the like in the echo path.

When distortion is generated in the echo path, the echo suppressing apparatus of the first exemplary embodiment carries out a nonlinear operation for the frequency ranges in spectral subtractor 6 to remove the distortion component in the echo. The echo suppressing apparatus of the first exemplary embodiment effectively removes the distortion component contained in the echo by using linear echo canceller 3 to adjust the temporal change in the signal component that is important in the nonlinear operation for the frequency ranges.

The output signal of microphone 1 contains not only the far-end signal but also an echo produced in association with the distortion of the far-end signal. The echo produced in association with the distortion can be considered to be the harmonic wave component of the far-end signal.

To simplify the following description, consider the case where echo component E contains only the harmonic wave component due to the distortion.

As seen from equation (3) described above, spectral subtractor 6 can remove echo component E in principle as long as Fourier transformation coefficient R for the far-end signal is not zero. To remove echo component E, the accuracy of crosstalk coefficient P1, which corresponds to the gain of the echo in the echo path, is important.

In the echo suppressing apparatus of the third example of related art, the amount of echo crosstalk is estimated based on the speech detection result when no near-end audio is detected in the output signal of the microphone, so that it is difficult to accurately detect audio in an environment in which high-level near-end noise is present. When the speech detection result is wrong, crosstalk coefficient P1 becomes extraordinarily large, and hence near-end signal P3, which is calculated based on wrong crosstalk coefficient P1, is also degraded. That is, the echo contained in near-end signal P3 is not sufficiently suppressed, so that the near-end audio has a large amount of distortion. To eliminate such as problem, the control can be made not to update crosstalk coefficient P1. In this case, however, when the amount of echo crosstalk varies, the error in crosstalk coefficient P1 increases and hence near-end signal P3, which is calculated based on crosstalk coefficient P1, is also degraded.

For example, when a folding-type hands-free mobile phone is used, or when the loudspeaker to be used can be switched, the amount of echo crosstalk varies depending on, for example, the angle of the folding hinge or the loudspeaker being used. In an environment in which high-level near-end noise is present, the caller often changes the use conditions to make the voice more audible. For example, the caller changes the angle of the hinge or switches the loudspeaker being used to another. In such cases, the corrected first signal will be degraded.

On the other hand, in this exemplary embodiment, crosstalk coefficient P1 is a constant set in advance according to use conditions. Therefore, by detecting the angle of the hinge or the loudspeaker being used, crosstalk coefficient P1 is provided without being affected by the noise contained in the near-end signal.

An experiment conducted by the present inventor by using a mobile phone shows that an echo and distorted sound in the near-end audio are removed in a more satisfactory manner when a constant that is set in advance according to use conditions is used as crosstalk coefficient P1 than when an estimated value having a large amount of error is used as crosstalk coefficient P1.

Another advantage of the echo suppressing apparatus of the first exemplary embodiment is that the residual echo can be removed even when the echo path estimation performed by linear echo canceller 3 shown in FIG. 8 is wrong.

In the above description, echo component E contains only the harmonic wave component due to the distortion. The echo suppressing apparatus of this exemplary embodiment can also suppress the echo component that is contained in the far-end signal but which does not result from the distortion, that is, the echo component from which the harmonic wave component has been removed.

For example, when the echo path estimation performed by linear echo canceller 3 is wrong, subtractor 4 shown in FIG. 8 can not remove the echo but can disadvantageously add an echo. Even in such a case, spectral subtractor 6 removes the far-end signal component, so that the echo can be sufficiently suppressed.

Further, in the echo suppressing apparatus of this exemplary embodiment, the provision of the echo suppression effect of spectral subtractor 6 can reduce the number of taps of linear echo canceller 3 (the number of taps of the adaptive filter) and hence reduce the amount of computation.

Figure 1:
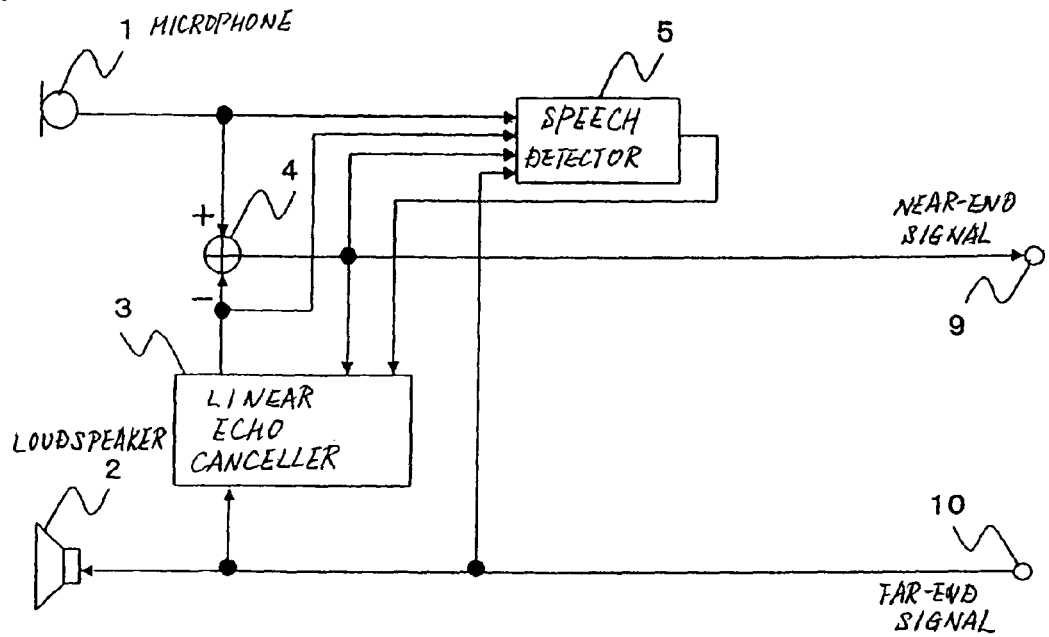
FIG. 1 is a block diagram showing the configuration of an echo suppressing apparatus of a first example of related art.
Figure 2:
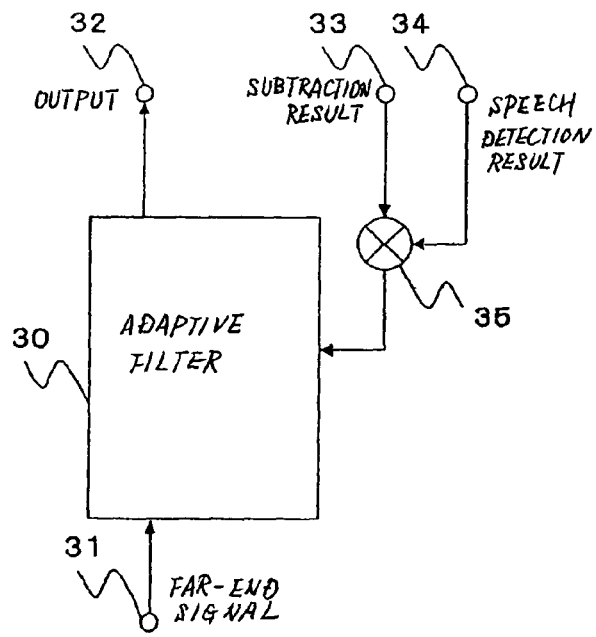
FIG. 2 is a block diagram showing an exemplary configuration of the linear echo canceller shown in FIG. 1.

In the echo suppressing apparatus of the first example of related art shown in FIG. 1, only linear echo canceller 3 is provided. Reducing the number of taps of the adaptive filter in linear echo canceller 3 therefore degrades the echo removal performance. However, in the echo suppressing apparatus of the first exemplary embodiment shown in FIG. 8, even when the number of taps of the adaptive filter decreases, the provision of spectral subtractor 6 compensates for the reduction in echo removal performance. Thus the echo suppressing apparatus has sufficient echo removal performance.

The echo suppressing apparatus of the first exemplary embodiment is provided with linear echo canceller 3 and a nonlinear operation for frequency ranges performed in spectral subtractor 6, which complement each other and hence provides sufficient echo removal capability.

That is, even when linear echo canceller 3 alone cannot sufficiently suppress an echo, for example, when the echo path generates distortion, or when the echo path estimation performed by linear echo canceller 3 is wrong, spectral subtractor 6 can suppress the echo.

Further, by using the output signal of linear echo canceller 3 to correct the output signal of the microphone, the harmonic wave component responsible for distortion can be suppressed without considering the temporal shift that the nonlinear operation for frequency ranges performed by spectral subtractor 6 alone cannot handle but using a simple estimation that uses only the amplitude value.

Moreover, by setting crosstalk coefficient P1 used in spectral subtractor 6 to a constant that is set in advance according to use conditions, an echo can be sufficiently suppressed even when the use conditions are changed, for example, in an environment in which high-level near-end noise is present, and in which near-end audio with less distortion is provided.

Further, since the echo suppressing apparatus of the first exemplary embodiment does not require complicated computation to estimate the amount of echo crosstalk, unlike the echo suppressing apparatus of the third example of related art, the amount of computation is reduced.

SECOND EXEMPLARY EMBODIMENT

Figure 13:
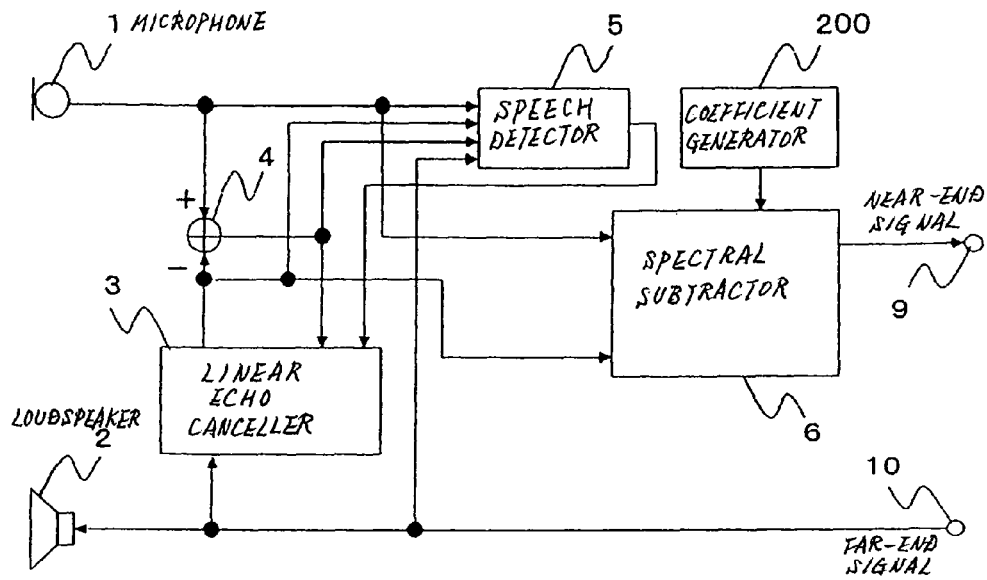
FIG. 13 is a block diagram showing the configuration of a second exemplary embodiment of the echo suppressing apparatus according to the present invention.

FIG. 13 is a block diagram showing the configuration of a second exemplary embodiment of the echo suppressing apparatus according to the present invention.

The echo suppressing apparatus of the second exemplary embodiment differs from the echo suppressing apparatus of the first exemplary embodiment in that spectral subtractor 6 receives the output signal of microphone 1 instead of the output signal of subtractor 4.

In the echo suppressing apparatus of the first exemplary embodiment, linear echo canceller 3 removes the primary component of the echo, whereas in the echo suppressing apparatus of the second exemplary embodiment, spectral subtractor 6 removes the primary component of the echo. Except for the above configuration and operation, the second exemplary embodiment is the same as the first exemplary embodiment, and the removal of the echo resulting from distortion is advantageously carried out as in the first exemplary embodiment.

Therefore, in the echo suppressing apparatus of the second exemplary embodiment as well, spectral subtractor 6 can sufficiently suppress the echo even when linear echo canceller 3 alone cannot sufficiently suppress the echo, for example, when the acoustic transfer system generates distortion or when the echo path estimation performed by linear echo canceller 3 is wrong, as in the first exemplary embodiment.

Further, by setting crosstalk coefficient P1 used in spectral subtractor 6 to a constant that is set in advance according to use conditions, the echo can be sufficiently suppressed even when the use conditions are changed in an environment in which high-level near-end noise is present, and in which near-end audio with less distortion is provided.

Spectral subtractor 6 is not necessarily configured as shown in the first and second exemplary embodiments, but may use, for example, spectral subtraction described in non-patent document 2 (Xiaojian Lu and Benoit Champagne, "Acoustical Echo Cancellation Over A Non-Linear Channel", International Workshop on Acoustic Echo and Noise Control 2001) or spectral subtraction described in non-patent document 3 (A. Alvarez et al., "A Speech Enhancement System Based On Negative Beamforming And Spectral Subtraction", International Workshop on Acoustic Echo and Noise Control 2001).

THIRD EXEMPLARY EMBODIMENT

Figure 14:
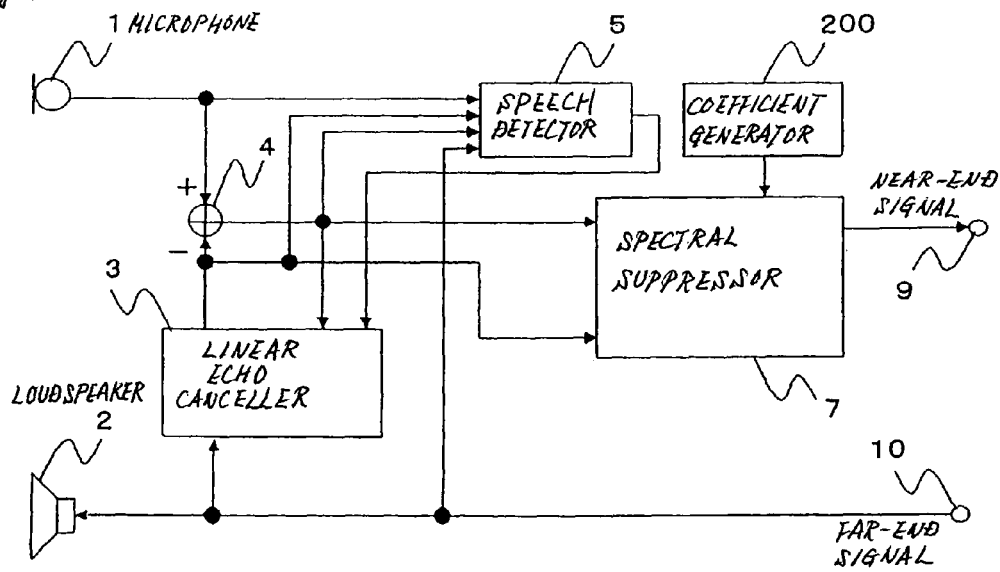
FIG. 14 is a block diagram showing the configuration of a third exemplary embodiment of the echo suppressing apparatus according to the present invention.

FIG. 14 is a block diagram showing the configuration of a third exemplary embodiment of the echo suppressing apparatus according to the present invention.

The echo suppressing apparatus of the third exemplary embodiment differs from the echo suppressing apparatus of the first exemplary embodiment in that spectral subtractor 6 shown in FIG. 8 is replaced with spectral suppressor 7. Except the above configuration and operation, the third exemplary embodiment is the same as the first exemplary embodiment. A detailed description of the common portions will therefore be omitted.

Spectral suppressor 7 shown in FIG. 14 will be described below with reference to the corresponding Figs.

Figure 15:
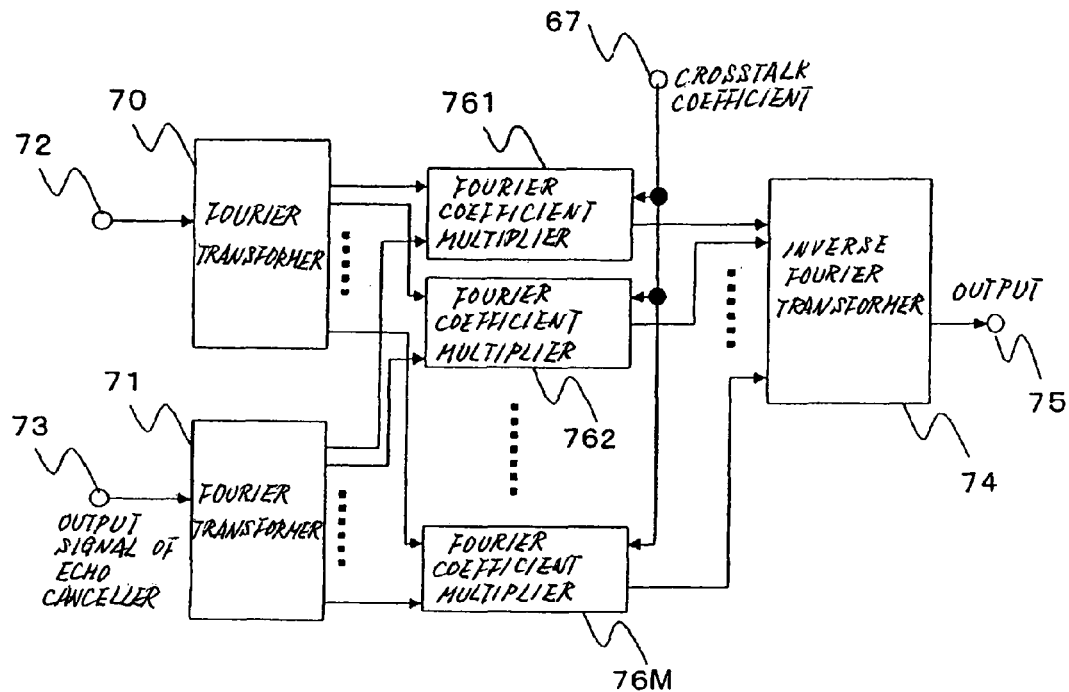
FIG. 15 is a block diagram showing an exemplary configuration of the spectral suppressor shown in FIG. 14.

FIG. 15 is a block diagram showing an exemplary configuration of the spectral suppressor shown in FIG. 14.

As shown in FIG. 15, spectral suppressor 7 includes Fourier transformers 70 and 71, Fourier coefficient multipliers 76$m$ (m=1 to M), and inverse Fourier transformer 74.

Fourier transformer 70 carries out M-point Fourier transformation on the output signal of subtractor 4 shown in FIG. 14, which is inputted through terminal 72, and outputs the processed results (amplitude and phase) as first Fourier coefficients to Fourier coefficient multipliers 76$m$ (m=1 to M) corresponding to the respective frequency ranges.

Fourier transformer 71 carries out M-point Fourier transformation on the output signal (echo replica signal) of linear echo canceller 3 shown in FIG. 14, which is inputted through terminal 73, and outputs the processed results (amplitude and phase) as second Fourier coefficients to Fourier coefficient multipliers 76$m$ corresponding to the respective frequency ranges.

Each of Fourier coefficient multipliers 76$m$ receives the first Fourier coefficient outputted from Fourier transformer 70, the second Fourier coefficient outputted from Fourier transformer 71, and the crosstalk coefficient outputted from coefficient generator 200 shown in FIG. 14, which is inputted through terminal 67, carries out multiplication operations using the amplitude components of the received coefficients to calculate a Fourier coefficient, and outputs the calculation results (amplitude and phase) to inverse Fourier transformer 74.

Inverse Fourier transformer 74 carries out inverse Fourier transformation on the group of Fourier coefficients outputted from Fourier coefficient multipliers 76$m$ (m=1 to M), and outputs the real part of the processed result from terminal 75. In the configuration shown in FIG. 15, a near-end signal with a suppressed echo component is obtained by Fourier coefficient multipliers 76$m$ (m=1 to M).

The configuration and operation of each of Fourier coefficient multipliers 76$m$ (m=1 to M) will be described with reference to FIG. 16.

Figure 16:
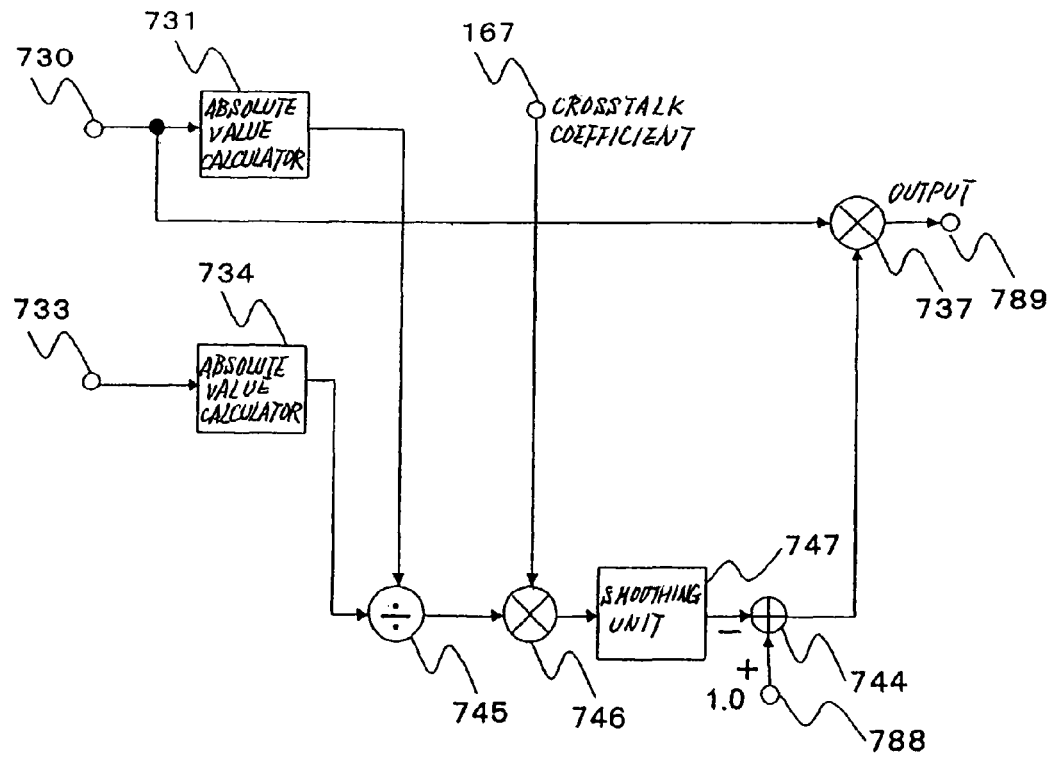
FIG. 16 is a block diagram showing a first exemplary configuration of the Fourier coefficient multiplier shown in FIG. 15.

FIG. 16 is a block diagram showing a first exemplary configuration of one of the Fourier coefficient multipliers shown in FIG. 15.

As shown in FIG. 16, the Fourier coefficient multiplier of the first exemplary configuration includes absolute value calculator 731, absolute value calculator 734, multiplier 737, divider 745, multiplier 746, smoothing unit 747, and subtractor 744.

The first Fourier coefficients for the respective frequency ranges outputted from Fourier transformer 70 shown in FIG. 15 are outputted to absolute value calculator 731 and multiplier 737 through terminal 730. The second Fourier coefficients outputted from Fourier transformer 71 shown in FIG. 15 are outputted to absolute value calculator 734 through terminal 733.

Absolute value calculator 731 calculates the absolute value of the first Fourier coefficient and outputs the calculation result to divider 745. Absolute value calculator 734 calculates the absolute value of the second Fourier coefficient and outputs the calculation result to divider 745. Divider 745 divides the calculation result from absolute value calculator 734 by the calculation result from absolute value calculator 731, and outputs the calculation result to multiplier 746.

Multiplier 746 multiplies the crosstalk coefficient generated in coefficient generator 200, which is inputted to terminal 167, by the output signal of divider 745 and outputs the calculation result to smoothing unit 747. Smoothing unit 747 smoothes the output signal of multiplier 746 and outputs the smoothed signal to subtractor 744.

Subtractor 744 subtracts the output value of smoothing unit 747 from the value of "1.0" and outputs the calculation result to multiplier 737. Multiplier 737 multiplies the output value of subtractor 744 by the first Fourier coefficient outputted from Fourier transformer 70 and outputs the multiplication result. The output signal of multiplier 737 is outputted through terminal 789 to inverse Fourier transformer 74 shown in FIG. 15.

Figure 17:
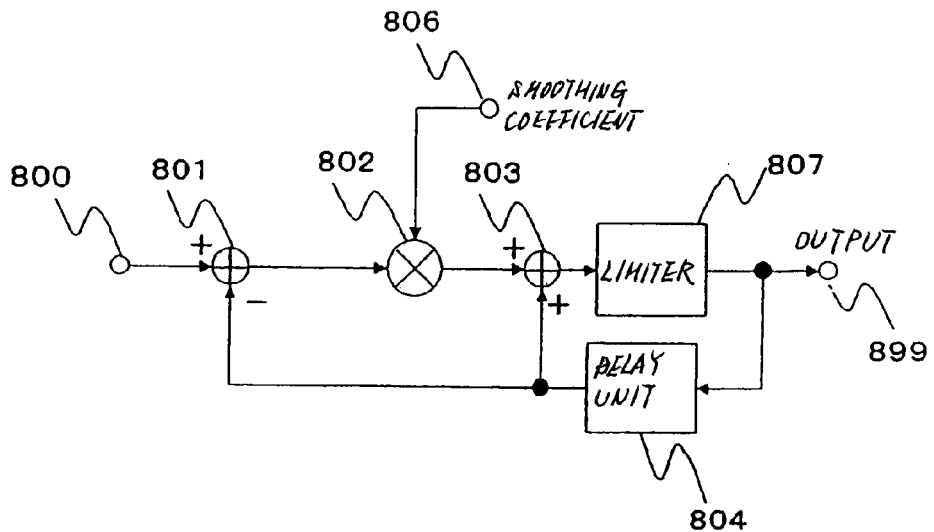
FIG. 17 is a block diagram showing an exemplary configuration of the smoothing unit shown in FIG. 16.

FIG. 17 is a block diagram showing an exemplary configuration of the smoothing unit shown in FIG. 16.

Smoothing unit 747 shown in FIG. 17 includes subtractor 801, multiplier 802, adder 803, limiter 807, and delay unit 804.

The input signal to smoothing unit 747 (output signal of multiplier 746) is supplied to subtractor 801 through terminal 800. Subtractor 801 subtracts the output signal of delay unit 804 (output signal of the smoothing unit), which retards the output signal of the smoothing unit by one sampling time, from the input signal and outputs the calculation result to multiplier 802.

Multiplier 802 multiplies the output signal of subtractor 801 by a smoothing coefficient inputted through terminal 806 and outputs the computation result to adder 803. Adder 803 adds the output signal of multiplier 802 to the output signal of delay unit 804 and outputs the computation result to limiter 807. Limiter 807 limits the amplitude of the output signal of adder 803 in such a way that the amplitude falls within the range between predetermined upper and lower limits and outputs the limited signal to output terminal 899 and delay unit 804. Delay unit 804 retards the output signal of limiter 807 by one sampling time and outputs the retarded signal to subtractor 801 and adder 803.

Smoothing unit 747 shown in FIG. 17 is a so-called leaky integrator or a first-order IIR-type lowpass filter. In smoothing unit 747 shown in FIG. 17, the input smoothing coefficient is inversely proportional to the time constant of the smoothing process. Smoothing unit 747 is not necessarily configured as shown in FIG. 17, but may employ any configuration having a smoothing effect, such as a higher-order IIR-type filter.

Figure 18:
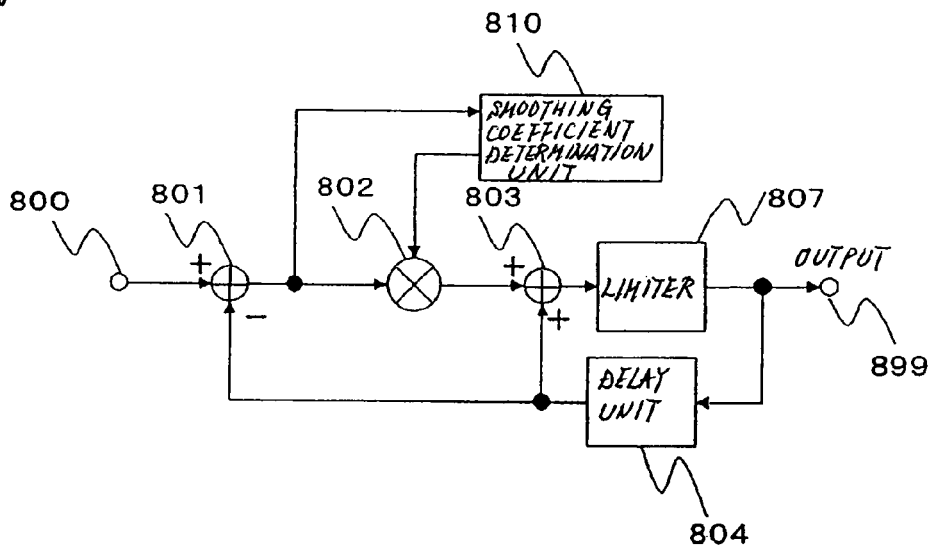
FIG. 18 is a block diagram showing another exemplary configuration of the smoothing unit shown in FIG. 16.

FIG. 18 is a block diagram showing another exemplary configuration of the smoothing unit shown in FIG. 16.

Smoothing unit 747 shown in FIG. 18 is similar to the smoothing unit shown in FIG. 17 except that smoothing coefficient determination unit 810 that generates a smoothing coefficient is added thereto. Smoothing coefficient determination unit 810 uses the output signal of subtractor 801 to generate a smoothing coefficient and outputs it to multiplier 802. In such a configuration, the rising rate and the falling rate of the output signal of smoothing unit 747 can be set in such a way that they are different from each other.

Smoothing coefficient determination unit 810 outputs a relatively small coefficient, for example, 0.001, when the output signal of subtractor 801 is positive, that is, when the output signal of subtractor 801 increases, whereas outputting a relatively large coefficient, for example, 0.01, when the output value of subtractor 801 is negative, that is, when the output signal of subtractor 801 decreases.

By thus setting the smoothing coefficient, the rate at which the output signal of smoothing unit 747 increases, that is, the rising rate, decreases, whereas the rate at which the output signal of smoothing unit 747 decreases, that is, the falling rate, increases. Therefore, the rising rate of the output signal of subtractor 744 shown in FIG. 16 increases, whereas the falling rate decreases. It is noted that the output signal of subtractor 744 is an estimation value of the proportion of the near-end audio and the near-end noise contained in the near-end signal.

In general, the change in amplitude, that is, the envelope characteristics of audio or music, is characterized in that the rising rate is large and the falling rate is small in many cases. The smoothing unit shown in FIG. 18 can present such envelope characteristics, so that the proportion of the near-end audio and the near-end noise contained in the near-end signal can be estimated with better accuracy.

The operation of subtractor 744 shown in FIG. 16 will be described with reference to equations.

The second row of equation (4) described above divided by S is smoothed value P4, which is expressed by the following equation (5). The right hand of equation (5) corresponds to the output value of subtractor 744 shown in FIG. 16.

$$P4 = Av[P3/S] \quad (5)$$
$$= Av[1 - \{(R/S) \times Av[(E+N)/R]\}]$$
$$= 1 - Av[\{(R/S) \times Av[(E+N)/R]\}]$$

Alternatively, the third row of equation (4) divided by S is smoothed value P4, which is expressed by the following equation:

$$P4 = Av[\{(A + E + N) - Ex[E + N]\}/S] \quad (6)$$
$$= Av[Ex[A]/S]$$
$$= Ex[A/S]$$

Comparing equation (6) with equation (5) shows that output value P4 of subtractor 744 is an estimated value of the proportion of the near-end audio contained in the near-end signal.

Therefore, multiplier 737 shown in FIG. 16 is used to multiply the output value of subtractor 744 by the output signal of subtractor 4 shown in FIG. 14, so as to provide an estimated value of the Fourier coefficient for the signal contained in the near-end signal that is not the echo, that is, the near-end audio having a suppressed echo. Inverse Fourier transformer 74 shown in FIG. 15 synthesizes the estimated values in terms of frequency to provide a near-end signal with a suppressed echo.

Next, a description will be made of how the echo suppressing apparatus of the third exemplary embodiment operates when loudspeaker 2 or the like in the echo path generates distortion.

As shown in equations (5) and (6), output value P4 of subtractor 744 shown in FIG. 16 is an estimated value of the proportion of the near-end audio contained in the near-end signal.

Value P4 is calculated, as shown in equation (5), by using P3 shown in the first exemplary embodiment. As described in the first exemplary embodiment, P3 is an estimated value of the Fourier coefficient component of the near-end audio, which is obtained by removing not only the echo component and the noise component but also the harmonic wave component-related echo generated by distortion. Therefore, P4 is a value from which the harmonic wave component-related echo generated by distortion is removed, and the Fourier coefficient obtained by multiplying P4 has a suppressed distortion-related echo component.

As described above, the output signal of microphone 1 contains not only the far-end signal (echo component) but also an echo that results from the distortion of the far-end signal. The echo that results from the distortion can be considered to be the harmonic wave component of the far-end signal.

According to the echo suppressing apparatus of the third exemplary embodiment, which includes spectral suppressor 7, the harmonic wave component contained in the far-end signal can be used to suppress the echo produced in association with the distortion of the far-end signal.

That is, in the echo suppressing apparatus of the third exemplary embodiment as well, spectral suppressor 7 can sufficiently suppress the echo even when linear echo canceller 3 alone cannot sufficiently suppress the echo, for example, when the echo path generates distortion or when the echo path estimation performed by linear echo canceller 3 is wrong.

Further, by setting the crosstalk coefficient to a constant that is set in advance according to use conditions, the echo can be sufficiently suppressed even when the use conditions are changed, for example, in an environment in which high-level near-end noise is present, and in which near-end audio with less distortion is provided.

Figure 19:
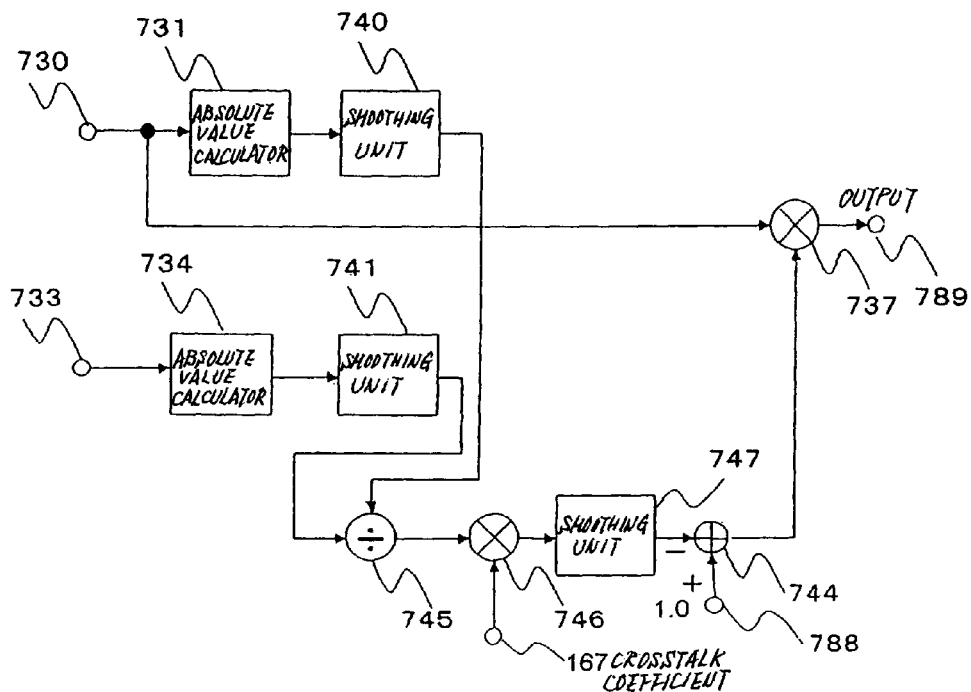
FIG. 19 is a block diagram showing a second exemplary configuration of the Fourier coefficient multiplier shown in FIG. 15.

FIG. 19 is a block diagram showing a second exemplary configuration of the Fourier coefficient multiplier shown in FIG. 15.

Fourier coefficient multiplier 76m of the second exemplary configuration differs from that of the first exemplary configuration shown in FIG. 16 in that smoothing unit 740 is inserted in the signal path from absolute value calculator 731 to divider 745, and smoothing unit 741 is inserted in the signal path from absolute value calculator 734 to divider 745.

Smoothing units 740 and 741 may be configured in a manner similar to smoothing unit 747 except that they use different smoothing coefficients. Therefore, a detailed description of smoothing units 740 and 741 will be omitted.

In Fourier coefficient multiplier 76m shown in FIG. 19, smoothing units 740 and 741 smooth the input values to divider 745, so that the value supplied from divider 745 through multiplier 746 to smoothing unit 747 is also smoothed. Therefore, smoothing unit 747 provides an output value that is more stable than that from Fourier coefficient multiplier 76m of the first exemplary configuration shown in FIG. 16.

The concepts of Fourier coefficient multipliers 76m of the first and second exemplary embodiments are the same in that subtractor 744 provides an estimated value of the proportion of the near-end audio contained in the near-end signal.

Therefore, when Fourier coefficient multiplier 76m of the second exemplary embodiment shown in FIG. 19 is used, the advantage of the present invention described above is provided as in the case where Fourier coefficient multiplier 76m of the first exemplary embodiment shown in FIG. 16 is used.

Figure 20:
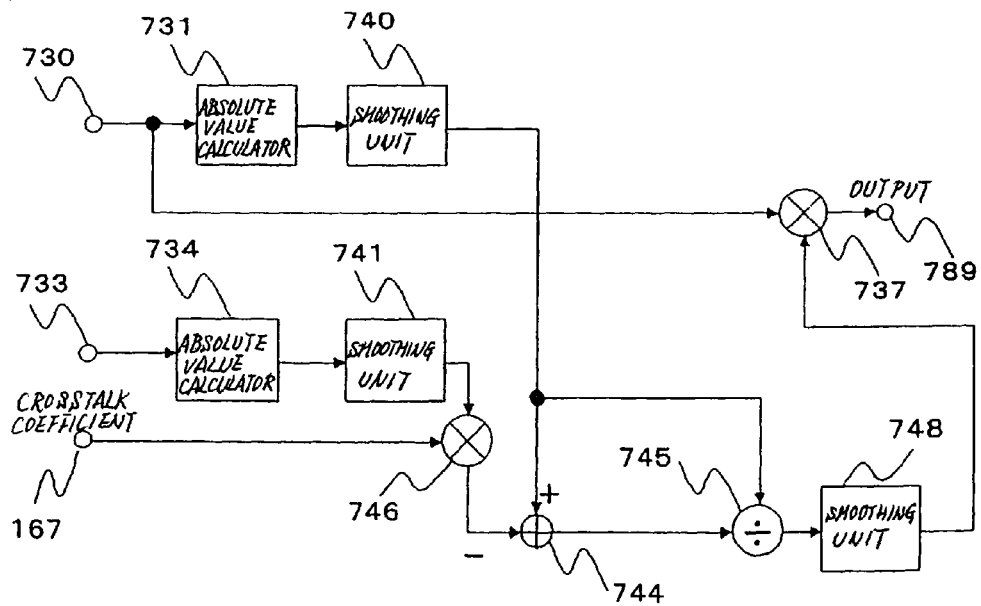
FIG. 20 is a block diagram showing a third exemplary configuration of the Fourier coefficient multiplier shown in FIG. 15.

FIG. 20 is a block diagram showing a third exemplary configuration of the Fourier coefficient multiplier shown in FIG. 15.

Fourier coefficient multiplier 76m of the third exemplary embodiment differs from that of the second exemplary embodiment shown in FIG. 19 in that the order of the processes performed in the stages from smoothing units 740 and 741 to multiplier 737 is different.

In Fourier coefficient multiplier 76m of the third exemplary embodiment, the output value of smoothing unit 740 is outputted to subtractor 744 and divider 745, and the output value of smoothing unit 741 is outputted to multiplier 746.

Multiplier 746 multiplies the output value of smoothing unit 741 by the crosstalk coefficient generated in coefficient generator 200 and outputs the computation result to subtractor 744. Subtractor 744 subtracts the output value of multiplier 746 from the output value of smoothing unit 740 and outputs the computation result to divider 745. Divider 745 divides the output value of subtractor 744 by the output value of smoothing unit 740 and outputs the computation result to smoothing unit 748. Smoothing unit 748 smoothes the output value of divider 745 and outputs the processed result to multiplier 737.

Smoothing unit 748 may be configured in a manner similar to smoothing unit 747 except that they use different smoothing coefficients.

Smoothing unit 748, if configured as shown in FIG. 18, can present envelope characteristics in which the rising rate is large and the falling rate is small, so that the proportion of the near-end audio and the near-end noise contained in the near-end signal can be estimated with better accuracy.

Output value P5 of smoothing unit 748 is expressed by the following equation (7):

$$\begin{aligned}P5 &= Av[(Av[S] - P1 \times Av[R](S)/Av[S])] \\ &= Av[(Av[((A + E + N)S - Ex[E]))/Av[S]] \\ &= Av[Ex[A + N]/Av[S]] \\ &= Ex[(A + N)/S]\end{aligned} \quad (7)$$

Equation (7) shows that output value P5 of smoothing unit 748 is an estimated value of the proportion of the near-end audio contained in the near-end signal as in the case of P4 described above.

Therefore, Fourier coefficient multiplier 76*m* of the third exemplary embodiment shown in FIG. 20 also has the same function as that of the second exemplary embodiment shown in FIG. 19, so that the advantage of the present invention described above is provided as in the case where Fourier coefficient multiplier 76*m* of the first exemplary embodiment shown in FIG. 16 is used.

FOURTH EXEMPLARY EMBODIMENT

Figure 21:
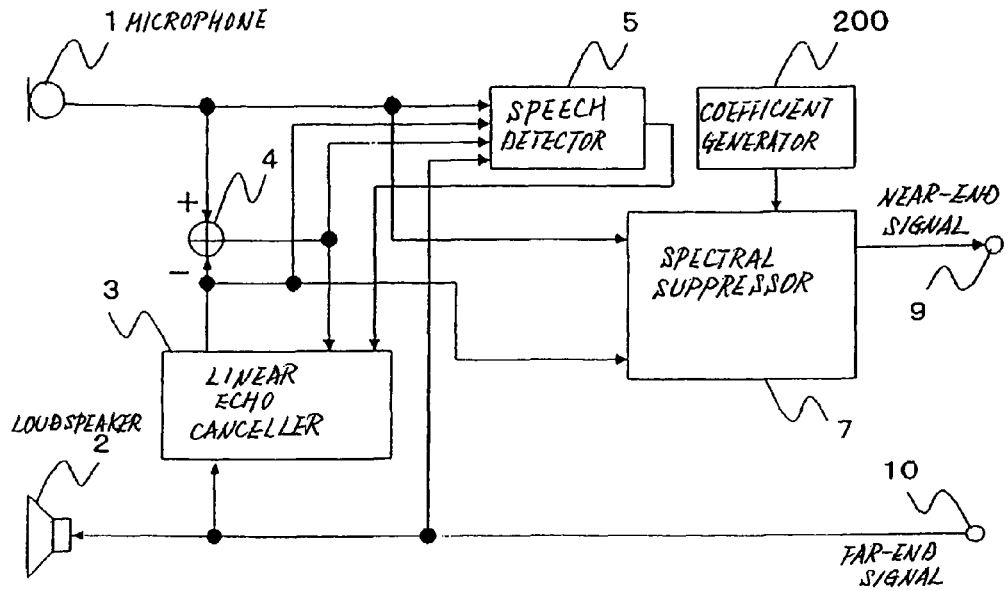
FIG. 21 is a block diagram showing the configuration of a fourth exemplary embodiment of the echo suppressing apparatus according to the present invention.

FIG. 21 is a block diagram showing the configuration of a fourth exemplary embodiment of the echo suppressing apparatus according to the present invention.

The echo suppressing apparatus of the fourth exemplary embodiment differs from the echo suppressing apparatus of the third exemplary embodiment shown in FIG. 14 in that spectral suppressor 7 receives the output signal of microphone 1 instead of the output signal of subtractor 4.

Therefore, in the echo suppressing apparatus of the third exemplary embodiment, linear echo canceller 3 removes the primary component of the echo, whereas in the echo suppressing apparatus of the fourth exemplary embodiment, spectral suppressor 7 removes the primary component of the echo.

Except for the above configuration and operation, the fourth exemplary embodiment is the same as the third exemplary embodiment, and the removal of the echo resulting from distortion is advantageously carried out as in the third exemplary embodiment.

Therefore, in the echo suppressing apparatus of the fourth exemplary embodiment as well, spectral suppressor 7 can sufficiently suppress the echo even when linear echo canceller 3 alone cannot sufficiently suppress the echo, for example, when the acoustic transfer system generates distortion or when the echo path estimation performed by linear echo canceller 3 is wrong as in the third exemplary embodiment.

Further, by setting the crosstalk coefficient used in spectral suppressor 7 to a value that is set in advance according to use conditions, the echo can be sufficiently suppressed even when the use conditions are changed in an environment in which high-level near-end noise is present, and in which near-end audio with less distortion is provided.

While the exemplary embodiments of the present invention have been described, the present invention is not limited to the first to fourth exemplary embodiments described above, but the following various changes can be made.

For example, in the first to fourth examples of related art, although the description has been made with reference to the case where spectral subtractor 6 and spectral suppressor 7 carry out Fourier transformation for each predetermined sampling period, the Fourier transformation is not necessarily carried out for each predetermined sampling period, but may be carried out on a fixed-interval frame basis.

Further, the Fourier transformation can be carried out in such a way that frames overlap each other. In this case, the amount of computation can be reduced by using an overlap-save method or an overlap-add method. An overlap-save method and an overlap-add method are described, for example, in non-patent document 4 (John J. Shynk, "Frequency-Domain and Multirate Adaptive Filtering", IEEE Signal Processing Magazine, January 1992, pp. 14-37).

In the first to fourth examples of related art, although the description has been made with reference to the case where spectral subtractor 6 and spectral suppressor 7 carry out Fourier transformation, Fourier transformation can be replaced with other linear transformation methods, such as cosine transformation and a filter bank, and the process can even be carried out after subband-domain transformation. In this case, the subtractors and multipliers for Fourier coefficients may be changed to correspond to the linear transformation to be used. For example, when cosine transformation is used, subtractors for cosine coefficients and multipliers for cosine coefficients may be used. The operation of each of such computation devices is the same as the operation for Fourier transformation used as the linear transformation in the first to fourth examples of related art described above.

FIFTH EXEMPLARY EMBODIMENT

While in the first to fourth exemplary embodiments, linear echo canceller 3 is used by way of example, a transform-domain echo canceller can be used to suppress an echo. In this case, the amount of computation in the entire echo suppressing apparatus can be reduced and the delay time associated with the computation can be shortened by setting the transform-domain of the transform-domain echo canceller to the same transform-domain as that of subtractor 6 or spectral suppressor 7 described above.

The transform-domain echo canceller herein refers to an echo canceller that suppresses an echo in a transform-domain expanded by using linear transformation and that carries out resynthesis in the original domain by using inverse linear transformation.

As the transform-domain echo canceller, the following description will be made, for example, with reference to a Fourier transform-domain echo canceller described in non-patent document 4.

Figure 22:
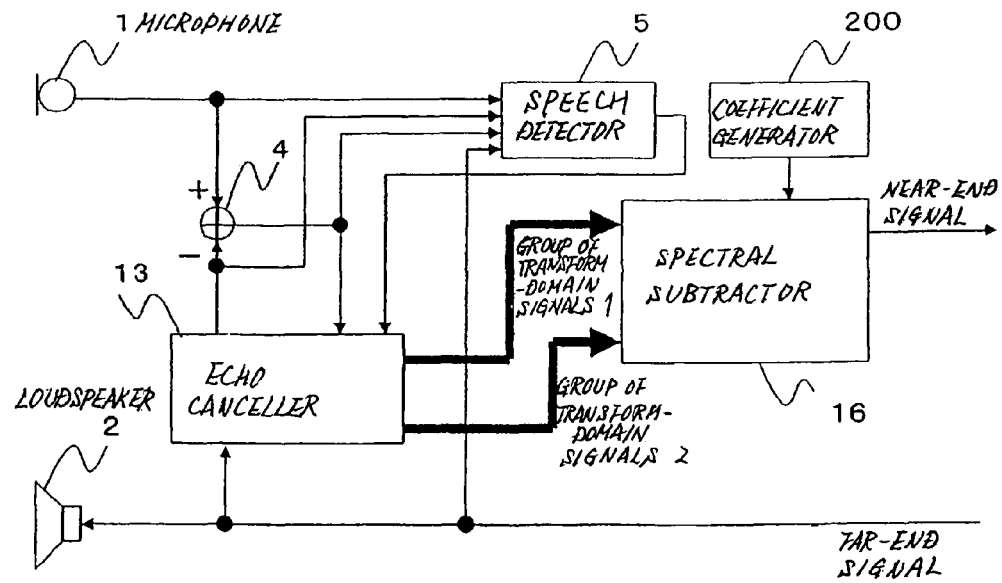
FIG. 22 is a block diagram showing the configuration of a fifth exemplary embodiment of the echo suppressing apparatus according to the present invention.

FIG. 22 is a block diagram showing the configuration of a fifth exemplary embodiment of the echo suppressing apparatus according to the present invention.

The echo suppressing apparatus of the fifth exemplary embodiment is configured in such a way that echo canceller 13 and spectral subtractor 16 carry out processing in a Fourier transform-domain. Echo canceller 13 outputs a group of transform-domain signals 1 and a group of transform-domain signals 2 to spectral subtractor 16.

Figure 23:
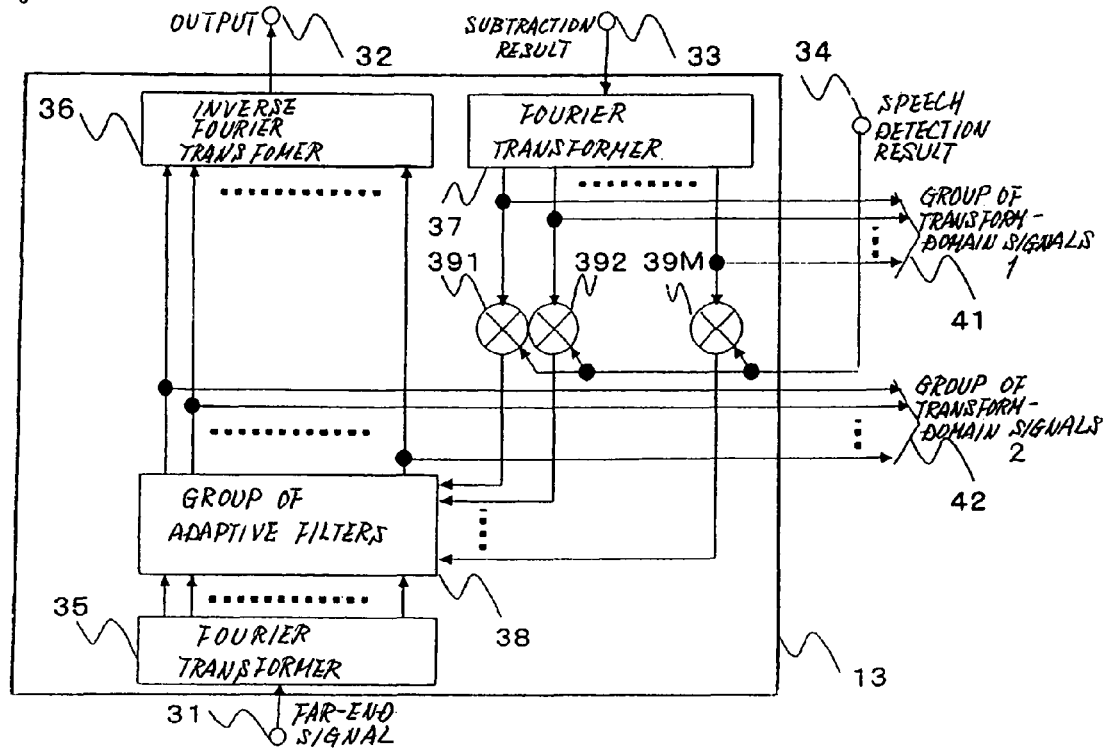
FIG. 23 is a block diagram showing an exemplary configuration of the echo canceller shown in FIG. 22.

FIG. 23 is a block diagram showing an exemplary configuration of the echo canceller shown in FIG. 22.

Echo canceller 13 shown in FIG. 23 includes Fourier transformer 35, a group of adaptive filters 38, inverse Fourier transformer 36, Fourier transformer 37, and multipliers 39*m* (m=1 to M).

The far-end signal inputted to terminal 31 is expanded by Fourier transformer 35 in a Fourier transform-domain and the expanded signals for respective frequency ranges are outputted to the group of adaptive filters 38. The subtraction result inputted from subtractor 4 shown in FIG. 22 through terminal 33 is expanded by Fourier transformer 37 in the Fourier transform-domain, and the expanded signals for the respective frequency ranges are outputted to multipliers 39m (m=1 to M).

Multipliers 39m (m=1 to M) multiply the signals received from Fourier transformer 37 by the speech detection result received through terminal 34 and output the computation results to the group of adaptive filters 38.

The group of adaptive filters 38, which include M adaptive filters, receive a group of signals 2 outputted from Fourier transformer 35 and a group of signals 1 outputted from multipliers 39m (m=1 to M) and performs adaptive filtering on signals that correspond to each other. The filtered outputs obtained by adaptive filtering are outputted to inverse Fourier transformer 36.

Inverse Fourier transformer 36 performs inverse Fourier transformation on the filtered outputs obtained from the group of adaptive filters 38 and outputs the processed result from terminal 32. The signal outputted from terminal 32 is the output signal from the echo canceller.

Echo canceller 13 also outputs the output signals of Fourier transformer 37 as a group of transform-domain signals 1 from vector output terminal 41. Echo canceller 13 also outputs the outputs of the group of adaptive filters 38 as a group of transform-domain signals 2 from vector output terminal 42. The group of transform-domain signals 1 and the group of transform-domain signals 2 will be used in spectral subtractor 16.

The group of transform-domain signals 1 can be considered to be the signals obtained by performing Fourier transformation on the output signal of subtractor 4 shown in FIG. 22, and the group of transform-domain signals 2 can be considered to be the signals obtained by performing Fourier transformation on the signal outputted from echo canceller 13 to subtractor 4 shown in FIG. 22.

The configuration and operation of spectral subtractor 16 shown in FIG. 22 will be described with reference to the corresponding Figs.

Figure 24:
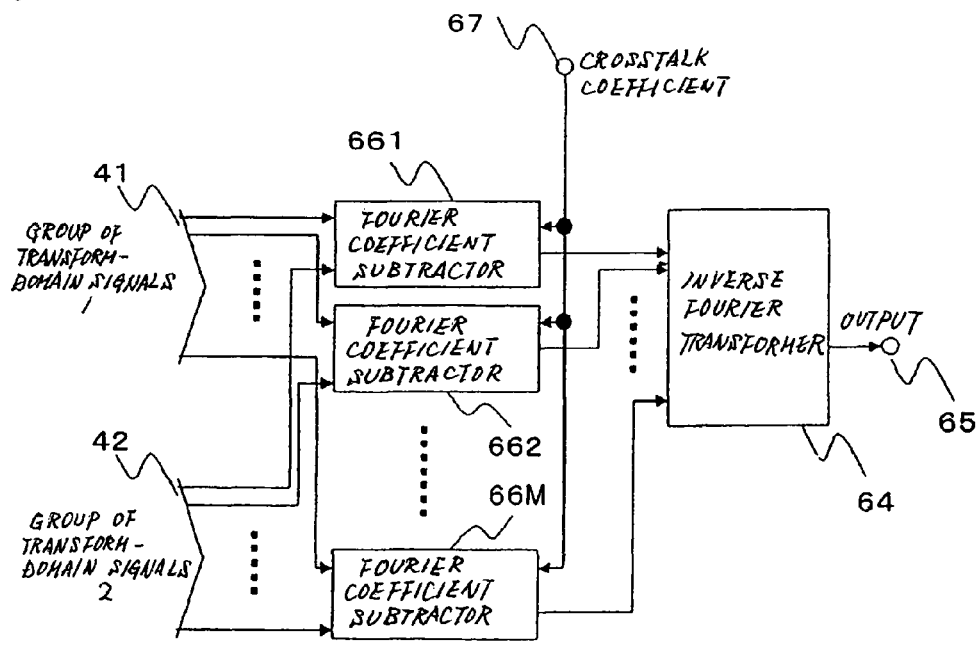
FIG. 24 is a block diagram showing an exemplary configuration of the spectral subtractor shown in FIG. 22.

FIG. 24 is a block diagram showing an exemplary configuration of the spectral subtractor shown in FIG. 22.

Spectral subtractor 16 shown in FIG. 24 differs from spectral subtractor 6 used in the echo suppressing apparatus of the first exemplary embodiment in that Fourier transformers 60 and 61 shown in FIG. 11 are removed and the group of transform-domain signals 1 and the group of transform-domain signals 2 are inputted.

As described above, the group of transform-domain signals 1 can be considered to be the signals obtained by performing Fourier transformation on the output signal of subtractor 4 shown in FIG. 22, and the group of transform-domain signals 2 can be considered to be the signals obtained by performing Fourier transformation on the signal outputted from echo canceller 13 to subtractor 4 shown in FIG. 22. These groups of signals are identical to the two signals inputted to Fourier coefficient subtractors 66m (m=1 to M) in spectral subtractor 6 shown in FIG. 11. Spectral subtractor 16 shown in FIG. 24 thus outputs signals identical to those outputted from spectral subtractor 6 shown in FIG. 11. Therefore, the echo suppressing apparatus of the fifth exemplary embodiment shown in FIG. 22 provides the same advantage as that provided in the echo suppressing apparatus of the first exemplary embodiment according to the present invention.

In the echo suppressing apparatus of the fifth exemplary embodiment, the amount of Fourier transformation performed by spectral subtractor 16 can be reduced by providing spectral subtractor 16 with the group of transform-domain signals 1 and the group of transform-domain signals 2 outputted from echo canceller 13.

Such a configuration is applicable to the echo suppressing apparatuses shown in the second to fourth exemplary embodiments. Further, the Fourier transform-domain can be replaced with, for example, a cosine transform-domain.

SIXTH EXEMPLARY EMBODIMENT

While in the first to fourth exemplary embodiments, linear echo canceller 3 is used by way of example, a subband-domain echo canceller, for example, described in non-patent document 4, can be used to suppress an echo. In this case, by carrying out the processes in spectral subtractor 6 or spectral suppresser 7 in a subband domain, a filter for subband domain transformation can be omitted.

FIG. 25 is a block diagram showing the configuration of a sixth exemplary embodiment of the echo suppressing apparatus according to the present invention.

In the echo suppressing apparatus of the sixth exemplary embodiment, the echo canceller and the spectral subtractor carry out their processes in a subband domain.

As shown in FIG. 25, in the echo suppressing apparatus of the sixth exemplary embodiment, the output signal of microphone 1 is expanded by subband analysis filter bank 91 into N frequency bands, and the far-end signal is expanded by subband analysis filter bank 92 into N frequency bands.

Echo cancellers 93n, subtractors 94n, speech detectors 95n, and spectral subtractors 96n (n=1 to N) are provided to correspond to the frequency bands expanded by subband analysis filter banks 91 and 92.

The output signals of spectral subtractors 96n undergo inverse transformation in subband synthesis filter bank 99, and the transformed signal in the original signal domain is outputted as the near-end signal.

Subtractors 94n, speech detectors 95n, and spectral subtractors 96n (n=1 to N) operate in each of the frequency bands in a manner similar to those in the echo suppressing apparatus of the first exemplary embodiment shown in FIG. 8 except that the number of taps of the echo canceller is different and the scale of the Fourier transformer in the spectral subtractor is different. Therefore, a description of the configuration and operation of each of these devices will be omitted.

In the echo suppressing apparatus of the sixth exemplary embodiment, since all processes are carried out after subband domain expansion, the synthesis filter bank in linear echo canceller 3 and the subband analysis filter bank in the spectral subtractor can be omitted. Therefore, the amount of computation corresponding to the subband analysis filter bank and the subband synthesis filter bank can be reduced, and the delay time corresponding to such computation can be shortened.

The configuration of the sixth exemplary embodiment shown in FIG. 25 is applicable to the echo suppressing apparatuses shown in the second to fourth exemplary embodiments. Further, the Fourier transform-domain can be replaced with, for example, a cosine transform-domain.

SEVENTH EXEMPLARY EMBODIMENT

FIG. 26 is a block diagram showing the configuration of a seventh exemplary embodiment of the echo suppressing apparatus according to the present invention.

In the echo suppressing apparatus of the seventh exemplary embodiment, the echo canceller and the spectral subtractor carry out their processes in a Fourier transform-domain.

As shown in FIG. 26, in the echo suppressing apparatus of the seventh exemplary embodiment, the output signal of microphone 1 is expanded by Fourier transformer 191 into M frequency bands, and the far-end signal is expanded by Fourier transformer 192 into M frequency bands.

Echo cancellers 193m, subtractors 194m, speech detectors 195m, and Fourier coefficient subtractors 66m (m=1 to M) are provided to correspond to the frequency bands expanded by Fourier transformers 191 and 192.

The output signals of Fourier coefficient subtractors 66m for the respective frequency bands undergo inverse transformation in inverse Fourier transformer 199, and the transformed signal in the original signal domain is outputted as the near-end signal.

Subtractors 194m and speech detectors 195m operate in each of the frequency bands in a manner similar to those in the echo suppressing apparatus of the first exemplary embodiment shown in FIG. 8 except that the number of taps of the echo canceller is different. Therefore, a description of the configuration and operation of each of these devices will be omitted.

The echo suppressing apparatus of the seventh exemplary embodiment carries out the processes in the echo canceller and the spectral subtractor in a transform-domain as in the sixth exemplary embodiment, but differs from the echo suppressing apparatus of the sixth exemplary embodiment in that the number of frequency bands M is larger than that in the sixth exemplary embodiment because the processes are carried out in a Fourier transform-domain and the spectral subtractors are replaced with Fourier coefficient subtractors 66m.

In the echo suppressing apparatus of the seventh exemplary embodiment, since the processes are carried out after Fourier transform-domain expansion, Fourier transformation is not required for spectral subtraction. Therefore, no Fourier transformer or inverse Fourier transformer is required in the spectral subtractor in the seventh exemplary embodiment, and the operation necessary for spectral subtraction is carried out only by Fourier coefficient subtractors 66m.

In the echo suppressing apparatus of the seventh exemplary embodiment, the amount of computation that corresponds to the omitted Fourier transformer and inverse Fourier transformer can be reduced.

The configuration of the seventh exemplary embodiment shown in FIG. 26 is applicable to the echo suppressing apparatuses shown in the second to fourth exemplary embodiments. Further, the Fourier transform-domain can be replaced with, for example, a cosine transform-domain.

In the seventh exemplary embodiment, although a linear echo canceller is used by way of example, a nonlinear echo canceller can be used to suppress an echo. In this case as well, by carrying out the processes in the spectral subtractor or the spectral suppresser in a Fourier transform-domain, the same advantage described above is provided.

While the echo suppressing apparatuses of the present invention have been described with reference to a hands-free phone, the present invention is applicable to various apparatuses in which a loudspeaker produces audio and a microphone picks up sound at the same time, for example, an apparatus in which sound is picked up when a loudspeaker is producing music, or an apparatus in which an echo from a receiver provided in a handset causes a problem.

The invention claimed is:

1. An echo suppressing method comprising:
   determining a plurality of crosstalk coefficients, each crosstalk coefficient of the plurality of crosstalk coefficients being a constant value;
   determining a use condition;
   selecting a crosstalk coefficient, from the plurality of crosstalk coefficients, based on the determined use condition;
   using a signal that is transformed in a frequency domain from either an output signal of a sound pickup device or from a signal obtained by subtracting an output signal having an echo suppressed from the output signal of said sound pickup device as a first signal;
   using a signal that is transformed in a frequency domain from the output signal having an echo suppressed as a second signal;
   multiplying said second signal by the selected crosstalk coefficient;
   estimating the amount of echo contained in said first signal based on the multiplication result; and
   suppressing the echo component in said first signal by using the estimated amount of echo.

2. The echo suppressing method according to claim 1, wherein said use condition is one or more from among the power or amplitude of the output signal of said echo canceller, the power or amplitude of a far-end signal, and the power or amplitude of a specific frequency component of said far-end signal.

3. The echo suppressing method according to claim 1, wherein said use condition is the sound level that said loudspeaker has been set to produce.

4. The echo suppressing method according to claim 1, wherein said use condition is the relative positional relationship between said sound pickup device and said loudspeaker.

5. The echo suppressing method according to claim 1, wherein said use condition is the sound pickup device or loudspeaker being used when one or more from among said sound pickup device and said loudspeaker is/are provided in multiple numbers.

6. The echo suppressing method according to claim 1, further comprising:
   identifying a plurality of frequency ranges; and
   determining the plurality of crosstalk coefficients corresponding to the respective frequency ranges.

7. The echo suppressing method according to claim 1, wherein:
   the use condition is determined by identifying the use condition from a plurality of use conditions, and
   the plurality of crosstalk coefficients correspond to the plurality of use conditions.

* * * * *